(12) United States Patent
Kiyose et al.

(10) Patent No.: US 8,610,068 B2
(45) Date of Patent: Dec. 17, 2013

(54) OPTICAL POSITION DETECTION DEVICE AND EQUIPMENT WITH POSITION DETECTION FUNCTION

(71) Applicant: Seiko Epson Corporation, Tokyo (JP)

(72) Inventors: Kanechika Kiyose, Matsumoto (JP);

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/922,753

(22) Filed: Jun. 20, 2013

(65) Prior Publication Data
US 2013/0277557 A1    Oct. 24, 2013

Related U.S. Application Data

(63) Continuation of application No. 13/097,507, filed on Apr. 29, 2011, now Pat. No. 8,492,719.

(30) Foreign Application Priority Data

May 13, 2010   (JP) .................................. 2010-110877

(51) Int. Cl.
*G01J 5/00*   (2006.01)
*G01C 21/02*  (2006.01)

(52) U.S. Cl.
USPC .................... 250/338.1; 250/206.1; 250/206.2

(58) Field of Classification Search
USPC ........................ 250/338.1, 206.1, 206.2, 221
See application file for complete search history.

(56) References Cited

U.S. PATENT DOCUMENTS

| | | |
|---|---|---|
| 5,103,085 A | 4/1992 | Zimmerman |
| 6,953,926 B2 | 10/2005 | Reime |
| 2001/0037186 A1 | 11/2001 | Kida et al. |
| 2004/0217267 A1 | 11/2004 | Reime |
| 2009/0135162 A1 | 5/2009 | Van De Wijdeven et al. |
| 2009/0309838 A1 | 12/2009 | Adan et al. |

FOREIGN PATENT DOCUMENTS

| | | |
|---|---|---|
| JP | 2001-306241 A | 11/2001 |
| JP | 2003-534554 A | 11/2003 |
| JP | 2004-535740 A | 11/2004 |

*Primary Examiner* — David Porta
*Assistant Examiner* — Faye Boosalis
(74) *Attorney, Agent, or Firm* — Harness, Dickey & Pierce, P.L.C.

(57) ABSTRACT

An optical position detection device includes a first detection light source unit that outputs a detection light from one side to the other side in a first direction, a second detection light source unit that is separated from the first detection light source unit along a second direction crossing the first direction, and outputs a detection light from the one side to the other side in the first direction, a light detection unit having sensitivity toward the other side in the first direction, and a position detection unit that detects the position of the object based on the light reception in the light detection unit.

8 Claims, 14 Drawing Sheets

OPTICAL POSITION DETECTION DEVICE AND EQUIPMENT WITH POSITION DETECTION FUNCTION

CROSS REFERENCE TO RELATED APPLICATIONS

This is a continuation application of U.S. application Ser. No. 13/097,507 filed Apr. 29, 2011 which claims priority to Japanese Patent Application No. 2010-110877 filed May 13, 2010 all of which are expressly incorporated by reference herein in their entireties.

BACKGROUND

1. Technical Field

The present invention relates to an optical position detection device that optically detects a position of a target object and equipment with position detection function including the optical position detection device.

2. Related Art

As an optical position detection device that optically detects a position of a target object, for example, a device in which detection lights are output from two detection light source units via a light-transmissive member toward the target object and the detection lights reflected by the target object are transmitted through the light-transmissive member and detected in a light detection unit has been suggested. In the optical position detection device, for example, on the basis of a result of a differential operation between the two detection light source units according to a detection result in the light detection unit, a ratio of a distance between one detection light source unit of the two detection light source units and the target object to a distance between the other detection light source unit and the target object is obtained, and the one-dimensional coordinate in a direction in which the two detection light source units are separated (see Patent Document 1 (JP-T-2003-534554)).

In application of the configuration described in Patent Document 1, two-dimensional coordinates may be detected by adding two detection light source units in a direction crossing the direction in which the two detection light source units are separated. However, in the case of the configuration for detection of two-dimensional coordinates by application of the configuration described in Patent Document 1, four detection light source units are necessary and the cost and the size of the optical position detection device are increased. Further, in the case where the differential operation between the detection light source units is used for obtaining two-dimensional coordinates, only the position of the target object within a region surrounded by the detection light source units or in a peripheral region thereof may be detected, and there is a problem that the detection range is smaller despite a large number of detection light source units.

SUMMARY

An advantage of some aspects of the invention is to provide an optical position detection device that can detect two-dimensional coordinates of a target object over a wider range using a smaller number of detection light source units and equipment with position detection function including the optical position detection device.

An aspect of the invention is directed to an optical position detection device that optically detects a first position of a target object in a first direction and a second position of the target object in a second direction crossing the first direction, and includes a first detection light source unit that outputs a detection light from one side to the other side in the second direction in the same position as that of the first detection light source unit in the second direction, a second detection light source unit that is separated from the first detection light source unit in the first direction, and outputs a detection light from the one side to the other side in the second direction, a light detection unit that receives the detection lights reflected by the target object located in an output space of the detection lights at the one side in the second direction, a light source drive unit that drives the first detection light source unit and the second detection light source unit, and a position detection unit that detects the first position and the second position of the target object based on received light results of the light detection unit when the light source drive unit sequentially turns on the first detection light source unit and the second detection light source unit, a received light result of the light detection unit when the light source drive unit simultaneously turns on the first detection light source unit and the second detection light source unit, or a result obtained by synthesizing the received light results of the light detection unit when the light source drive unit sequentially turns on the first detection light source unit and the second detection light source unit.

In the aspect of the invention, the detection of the position of the target object based on "received light result of light detection unit" contains both the detection of the position of the target object using the received light intensity itself in the light detection unit and detection of the position of the target object based on current values (amounts of control) in the case where current values to be supplied to the detection light source units are adjusted so that the received light intensity in the light detection unit may take a predetermined value. Further, in the aspect of the invention, the result obtained by synthesizing the received light results of the light detection unit contains both a sum of the received light intensity itself in the light detection unit and a sum of the current values (amounts of control) in the case where the current values to be supplied to the detection light source units are adjusted so that the received light intensity in the light detection unit may take a predetermined value.

In the optical position detection device to which the invention is applied, the first detection light source unit and the second detection light source unit output the detection lights from the one side to the other side in the second direction, and the lights of the detection lights reflected by the target object located in the output space in which the detection lights are output are received by the light detection unit. Here, the first detection light source unit and the second detection light source unit are separated in the first direction. Accordingly, by obtaining a ratio or a difference between the received light intensity in the light detection unit when the first detection light source unit is turned on and the received light intensity in the light detection unit when the second detection light source unit is turned on, a ratio of a distance from the first detection light source unit to the target object in the first direction to a distance from the second detection light source unit to the target object in the first direction is known. Alternatively, using a ratio or a difference between current values after adjustment of the current values to be supplied to the first detection light source unit and the second detection light source unit so that the received light intensity in the light detection unit when the first detection light source unit is turned on and the received light intensity in the light detection unit when the second detection light source unit is turned on may be equal, the ratio of the distance from the first detection light source unit to the target object in the first direction to the distance from the second detection light source unit to the target object in the first direction is also known. Further, the first detection light source unit and the second detection light source unit are provided in the same position in the second direction. Accordingly, according to the received light intensity in the light detection unit when the first detection light source unit and the second detection light source unit are simultaneously turned on or the result obtained by synthesizing the received light intensity in the light detection unit when the first detection light source unit and the second detection light source unit are sequentially turned on, the position of the target object in the second direction is known. Furthermore, the position of the target object in the second direction is also known from the sum of the current values when the first detection light source unit and the second detection light source unit are driven so that the received light intensity in the light detection unit in the case where the first detection light source unit and the second detection light source unit are simultaneously turned on may take a predetermined value or the sum of the current values when the first detection light source unit and the second detection light source unit are driven so that the sum of the received light intensity in the light detection unit in the case where the first detection light source unit and the second detection light source unit are sequantially turned on may take a predetermined value. Thus, as the detection light source units, only by using two detection light source units (the first detection light source unit and the second detection light source unit), the first position and the second position of the target object may be detected. Moreover, for detection of the second position, the received light result in the light detection unit when the first detection light source unit and the second detection light source unit are simultaneously turned on or the result obtained by synthesizing the received light results in the light detection unit when the first detection light source unit and the second detection light source unit are sequentially turned on is used, and thus, even in the case where the target object is separated from the first detection light source unit and the second detection light source unit, the position of the target object in the second direction may be detected and the detection target range of the second position is wider.

In the aspect of the invention, it is preferable that the first detection light source unit and the second detection light source unit respectively include plural light emitting devices on the same straight line in the first direction.

According to the configuration, the light source drive unit may execute a first mode in which some light emitting devices of the plural light emitting devices are turned on and a second mode in which the other light emitting devices than those of the first mode of the plural light emitting devices are turned on. Accordingly, the size of the output space of the detection lights may be changed according to which of the plural light emitting devices are turned on. Therefore, if the position of the target object is generally known in the second mode, subsequently, it is necessary to output the detection lights only in the space in which the target object may be located in the first mode, and the power consumed for turning on the detection light source units may be reduced.

In the aspect of the invention, it is preferable that a light blocking member that limits an output range of the detection light in a third direction crossing the first direction and the second direction is provided for the first detection light source unit and the second detection light source unit. According to the configuration, the output space of the detection light may be limited in the third direction, and only the position of the target object located within a predetermined range in the third direction may be detected.

In the aspect of the invention, it is preferable that a third detection light source unit and a fourth detection light source unit that are separated from each other in a third direction crossing the first direction and the second direction and provided in the same position as each other in the second direction and output detection lights from the one side toward the other side in the second direction are further provided, and the position detection unit detects a third position of the target object in the third direction based on received light results of the light detection unit when the light source drive unit sequentially turns on the third detection light source unit and the fourth detection light source unit. According to the configuration, three-dimensional coordinates of the target object may be detected.

In the aspect of the invention, it is preferable that the detection light source units and the light detection unit are integrated as a unit. According to the configuration, there are advantages that the optical position detection device may easily be added to various kinds of equipment etc.

In the aspect of the invention, it is preferable that a reference light source that outputs reference light entering the light detection unit not via the output space of the detection lights is provided, and the position detection unit detects the position of the target object based on a result of a differential operation between the detection light source units and the reference light source according to the received light result of the light detection unit. According to the configuration, the second position may be detected without the influence of environment light.

In the aspect of the invention, it is preferable that the detection light is infrared light. According to the configuration, the detection light is not visually recognized, and, even in the case where the optical position detection device is provided in a display apparatus, display is not hindered, and thus, the optical position detection device may be used for various kinds of equipment.

The optical position detection device to which the invention is applied may be used for equipment with position detection function having a visual surface component member with a visual surface spreading along the first direction and the second direction, for example, and the equipment with position detection function is the following equipment, for example.

First, the visual surface component member may employ a configuration as a direct-view-type image generation device that displays an image as information, and, in this case, the visual surface is an image display surface on which the image is displayed in the direct-view-type image generation device. According to the configuration, the equipment with position detection function may be formed as a direct-view-type display apparatus with position detection function.

In the aspect of the invention, the visual surface component member may employ a configuration as a screen, and, in this case, the visual surface is a screen surface on which information is visually recognized in the screen.

In the aspect of the invention, a configuration in which an image projection apparatus that projects an image toward the screen is provided at the visual surface side with respect to the screen and the detection light sources and the light detection unit are provided integrally with the image projection apparatus may be employed. According to the configuration, the equipment with position detection function may be formed as a projection-type display apparatus with position detection function.

In the aspect of the invention, the visual surface component member may employ a configuration as a light-transmissive member that covers an exhibit as the information, and, in this case, the visual surface is a surface on which the exhibit is visually recognized at the opposite side to the side at which the exhibit is placed in the light-transmissive member. According to the configuration, the equipment with position detection function may be formed as a window with position detection function or the like.

In the aspect of the invention, the visual surface component member may employ a configuration as a base that supports a moving gaming medium, and, in this case, the visual surface is a surface on which a relative position of the base and the gaming medium is visually recognized in the base.

According to the configuration, the equipment with position detection function may be formed as an amusement machine such as a Japanese pinball machine or a coin game.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
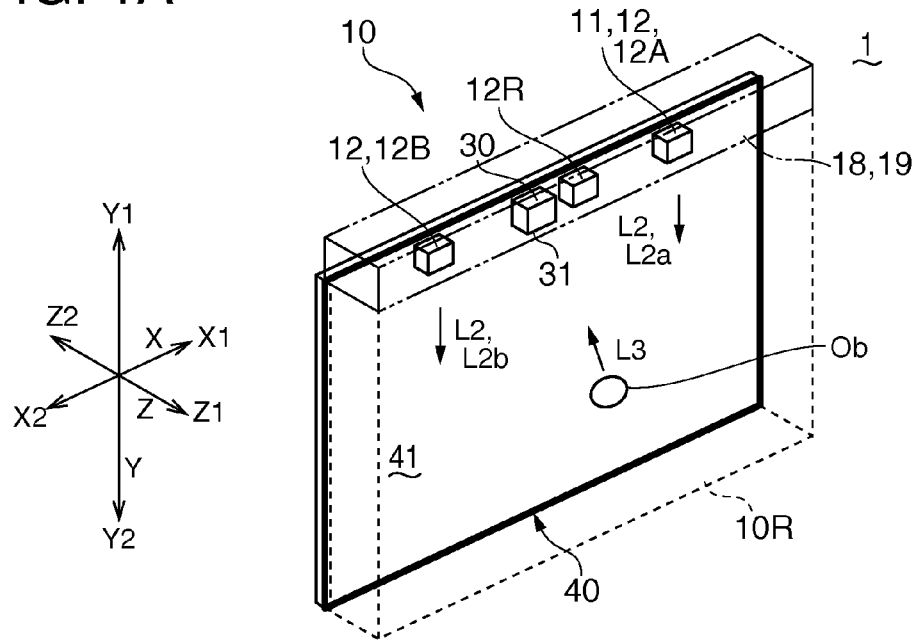
FIGS. 1A and 1B are explanatory diagrams schematically showing a main part of equipment with position detection function according to a first embodiment of the invention.

Next, embodiments of the invention will be explained in detail with reference to the accompanying drawings. In the following explanation, three directions crossing one another will respectively be referred to as an X-axis direction, a Y-axis direction, and a Z-axis direction, and the output direction of detection light is the Y-axis direction. Further, in the drawings referred to as below, one side in the X-axis direction will be shown as an X1-side, the other side will be shown as an X2-side, one side in the Y-axis direction will be shown as a Y1-side, the other side will be shown as a Y2-side, and one side in the Z-axis direction will be shown as a Z1-side, the other side will be shown as a Z2-side.

First Embodiment

Overall Configuration

Figure 1B:
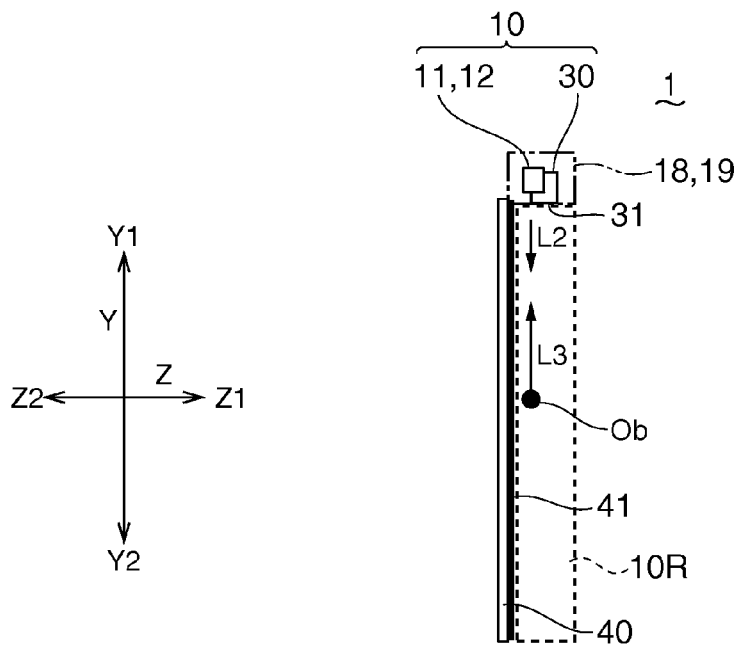
Figure 2A:
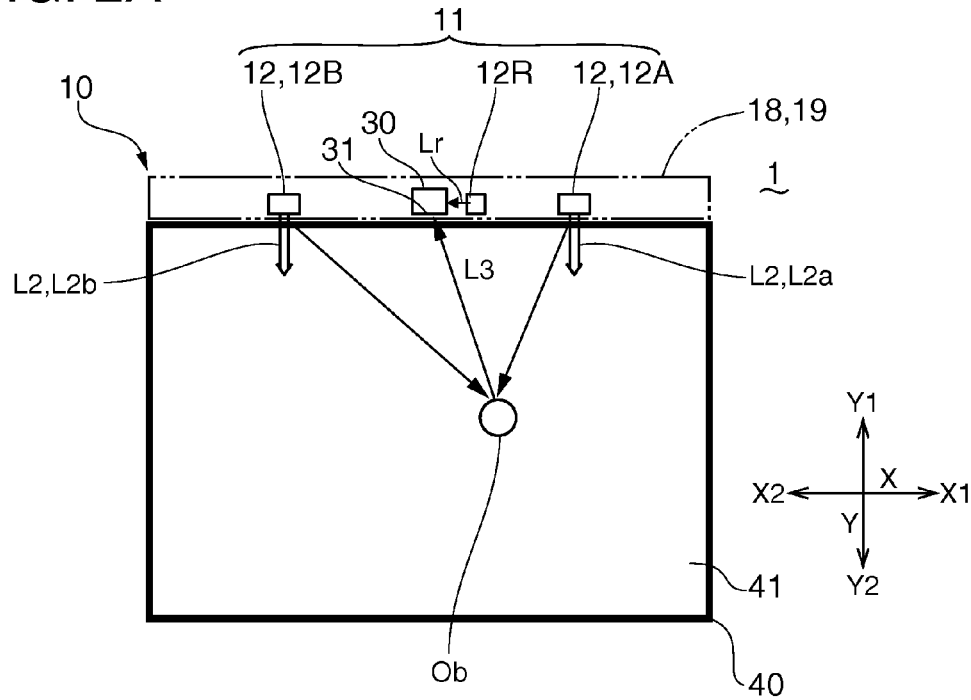
FIGS. 2A and 2B are explanatory diagrams showing a configuration of a light source etc. of an optical position detection device used for the equipment with position detection function according to the first embodiment of the invention.
Figure 2B:
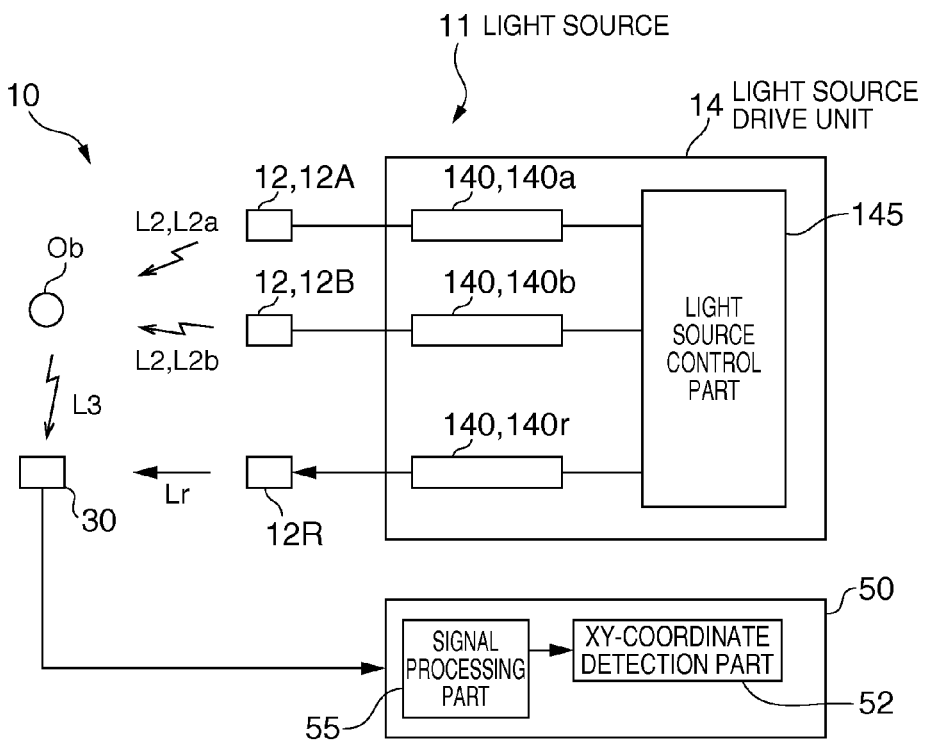

FIGS. 1A and 1B are explanatory diagrams schematically showing a main part of equipment with position detection function according to the first embodiment of the invention, and FIGS. 1A and 1B are an explanatory diagram of detection light source units seen from an output space side of detection lights and an explanatory diagram of the detection light source units seen from a lateral side. FIGS. 2A and 2B are explanatory diagrams showing a configuration of a light source etc. of an optical position detection device used for the equipment with position detection function according to the first embodiment of the invention, and FIGS. 2A and 2B are a plan view of the detection light source units seen from an output space of detection lights and an explanatory diagram showing an electric configuration thereof.

In FIGS. 1A, 1B, and 2A, the equipment with position detection function 1 of the embodiment includes a visual surface component member 40 having a visual surface 41 on which information is visually recognized and an optical position detection device 10 that detects a position of a target object Ob located at the visual surface 41 side (the one side Z1 in the Z-axis direction) with respect to the visual surface component member 40, and may be used as a screen device for electronic blackboard, a screen device for projection-type display apparatus, or the like.

The optical position detection device 10 includes a light source 11 having plural detection light source units 12 that output detection lights L2 from the one side Y1 toward the other side Y2 in the Y-axis direction, and a light detection unit 30 at the one side Y1 in the Y-axis direction with a light receiving part 31 directed toward the other side Y2. The visual surface component member 40 includes a sheet-like or plate-like light-transmissive member and has the visual surface 41 spreading along the X-axis direction and the Y-axis direction.

The light source 11 includes, as the plural detection light source units 12, a first detection light source unit 12A and a second detection light source unit 12B provided at the one side Y1 in the Y-axis direction along the side part extending in the X-axis direction in the visual surface component member 40. The first detection light source unit 12A and the second detection light source unit 12B are separated in the X-axis direction in the same position in the Y-axis direction.

Further, the optical position detection device 10 includes the light detection unit 30 at the one side Y1 in the Y-axis direction in the side part extending in the X-axis direction in the visual surface component member 40. The light detection unit 30 is provided between the first detection light source unit 12A and the second detection light source unit 12B, and separated from each of the first detection light source unit 12A and the second detection light source unit 12B in the X-axis direction and located in the same position as those of the first detection light source unit 12A and the second detection light source unit 12B in the Y-axis direction. Accordingly, the first detection light source unit 12A, the light detection unit 30, and the second detection light source unit 12B are arranged in this order on the same straight line in the X-axis direction. Further, the light detection unit 30, the first detection light source unit 12A, and the second detection light source unit 12B are located to project from the visual surface component member 40 toward the one side Z1 in the Z-axis direction.

Here, the center optical axes of the detection light source units 12 (the first detection light source unit 12A and the second detection light source unit 12B) are in parallel to each other. Further, the center optical axes of the detection light source units 12 are also in parallel to the visual surface 41 of the visual surface component member 40. Accordingly, the detection light source units 12 (the first detection light source unit 12A and the second detection light source unit 12B) output detection lights L2 (detection lights L2a, L2b) along the visual surface 41 side in the visual surface component member 40. Therefore, as shown by dotted lines in FIGS. 1A and 1B, in the embodiment, the space in which the visual surface 41 is located in the visual surface component member 40 is an output space of the detection lights L2, and a detection space 10R in which the position of the target object Ob is detected is formed by the output space. When the target object Ob exists in the detection space 10R set as above, parts of the detection lights L2 (detection lights L2a, L2b) output from the detection light source units 12 (the first detection light source unit 12A and the second detection light source unit 12B) are reflected by the target object Ob and parts of reflected lights L3 are received by the light detection unit 30.

Each of the first detection light source unit 12A and the second detection light source unit 12B includes an LED (light emitting diode) or the like, and emits the detection light L2a or L2b of infrared light having a peak wavelength from 840 to 1000 nm as a divergent light. Further, the light detection unit 30 includes a photodiode, a phototransistor, or the like, and, in the embodiment, the light detection unit 30 is a photodiode having a sensitivity peak in the infrared range.

In the optical position detection device 10, the light source 11 includes a reference light source 12R with a light emitting part directed toward the light detection unit 30 between the light detection unit 30 and the first detection light source unit 12A, and the reference light source 12R is also located to project from the visual surface component member 40 toward the one side Z1 in the Z-axis direction like the light detection unit 30, the first detection light source unit 12A, and the second detection light source unit 12B. Accordingly, the first detection light source unit 12A, the reference light source 12R, the light detection unit 30, and the second detection light source unit 12B are arranged in this order on the same straight line in the X-axis direction. The reference light source 12R includes an LED (light emitting diode) or the like, and the reference light source 12R emits reference light Lr of infrared light having a peak wavelength from 840 to 1000 nm as a divergent light. Note that the reference light Lr output from the reference light source 12R is allowed not to enter the visual surface 41 side (the detection space 10R) of the visual surface component member 40, but to enter the light detection unit 30 not via the detection space 10R because of the direction of the reference light source 12R, a light blocking cover (not shown) provided in the reference light source 12R, or the like.

In the optical position detection device 10 having the above described configuration, the light detection unit 30 and the light source 11 (the first detection light source unit 12A, the second detection light source unit 12B, and the reference light source 12R) are arranged along one side part of the visual surface component member 40. Accordingly, in the embodiment, the light detection unit 30 and the light source 11 are held in a common housing 19 shown by chain double-dashed lines and integrated as an optical unit 18.

Configuration of Position Detection Unit or the Like

As shown in FIG. 2B, the light source 11 include a light source drive unit 14 that drives the plural detection light source units 12. The light source drive unit 14 includes a light source drive circuit 140 that drives the detection light source units 12 and the reference light source 12R, and a light source control part 145 that controls turn-on patterns of the respective plural detection light source units 12 and reference light source 12R via the light source drive circuit 140. The light source drive circuit 140 includes light source drive circuits 140a, 140b that drive the first detection light source unit 12A and the second detection light source unit 12B and a light source drive circuit 140r that drives the reference light source 12R via the light source drive circuit 140. Not that, regarding the light source drive circuits 140a, 140b, a configuration that drives the plural detection light source units 12 using the common light source drive circuit 140 may be employed using a switching circuit or the like.

A position detection unit 50 is electrically connected to the light detection unit 30, and a detection result in the light detection unit 30 is output to the position detection unit 50. The position detection unit 50 includes a signal processing part 55 for detection of the position of the target object Ob based on the detection result in the light detection unit 30, and an XY-coordinate detection part 52 that detects an X-coordinate (a position in a first direction (a first position)) and a Y-coordinate (a position in a second direction (a second position)). Thus formed position detection unit 50 and light source drive unit 14 operate in coordination with each other and perform position detection, which will be described later.

Detection Principle of X-coordinate Information

Figure 3A:
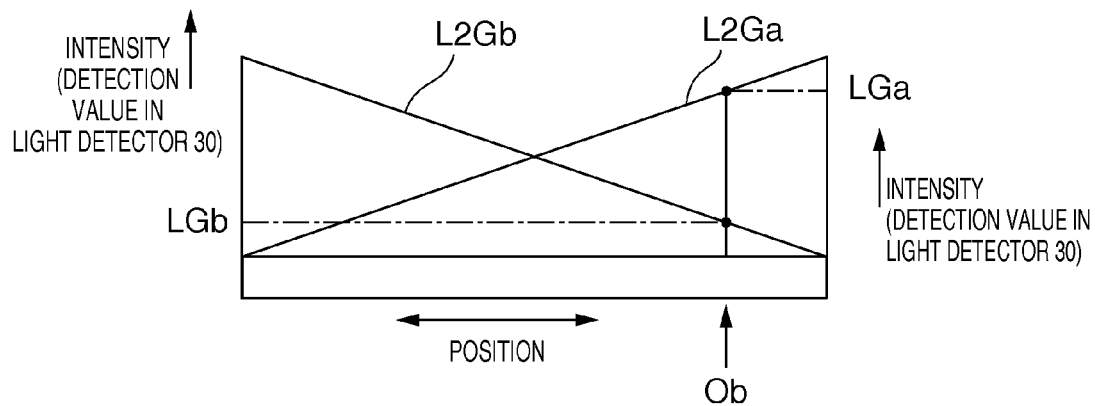
FIGS. 3A and 3B are explanatory diagrams showing a basic principle when coordinate detection is performed using a differential operation in the optical position detection device of the equipment with position detection function according to the first embodiment of the invention.
Figure 3B:
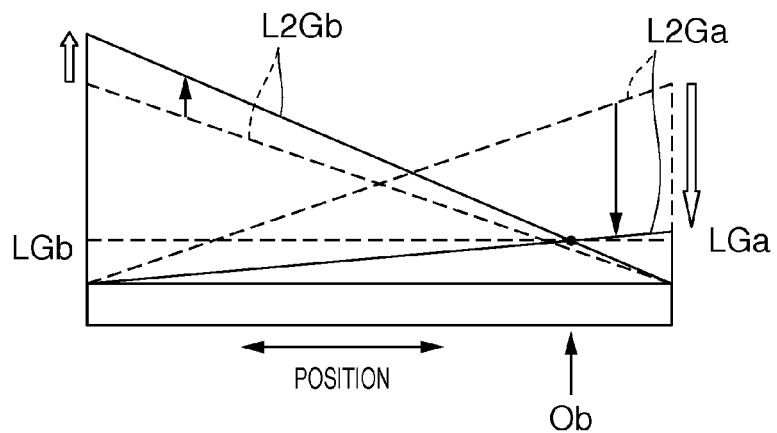

FIGS. 3A and 3B are explanatory diagrams showing a basic principle when coordinate detection is performed using a differential operation in the optical position detection device 10 of the equipment with position detection function 1 according to the first embodiment of the invention, and FIGS. 3A and 3B are an explanatory diagram schematically showing a relationship between the position of the target object Ob and received light intensity in the light detection unit 30 and an explanatory diagram schematically showing a state in which output intensity of the detection lights L2a, L2b is adjusted so that the received light intensity in the light detection unit 30 may be equal.

In the optical position detection device 10 of the embodiment, as will be explained, a ratio of a distance between one detection light source unit 12 of the two detection light source units 12 and the target object Ob to a distance between the other detection light source unit 12 and the target object Ob is obtained using a differential operation between the detection light source units 12 or a differential operation between the detection light source unit 12 and the reference light source 12R, and an X-coordinate of the target object Ob is detected based on the ratio. As below, a basic principle when the X-coordinate of the target object Ob is detected using a result of the differential operation between the first detection light source unit 12A and the second detection light source unit 12B based on the received light result of the light detection unit 30.

In the optical position detection device 10 of the embodiment, the detection space 10R is set at the visual surface 41 side of the visual surface component member 40 (the space at the output side of the detection light L2 from the light source 11). Further, the first detection light source unit 12A and the second detection light source unit 12B are separated in the X-axis direction. Accordingly, when the detection light source unit 12A is turned on and outputs the detection light L2a, the detection light L2a forms a first light intensity distribution L2Ga in which intensity monotonically decreases from the one side X1 toward the other side X2 in the X-axis direction as shown in FIG. 3A. Further, when the second detection light source unit 12B is turned on and outputs the detection light L2b, the detection light L2b forms a second light intensity distribution L2 Gb in which intensity monotonically decreases from the other side X2 toward the one side X1 in the X-axis direction.

To obtain position information of the target object Ob using a differential operation between the detection lights L2a, L2b, the first detection light source unit 12A and the second detection light source unit 12B are sequentially turned on. More specifically, as shown in FIG. 3A, first, when the detection light source unit 12A is turned on and the second detection light source unit 12B is turned off, in the period, the first light intensity distribution L2Ga is formed. Further, when the detection light source unit 12A is turned off and the detection light source unit 12B is turned on, in the period, the second light intensity distribution L2 Gb is formed. In the periods, if the target object Ob is placed in the detection space 10R, the detection lights L2a, L2b are reflected by the target object Ob and parts of the reflected lights are detected by the light detection unit 30. In this regard, the reflection intensity on the target object Ob is proportional to the intensity of the detection lights L2 in the position in which the target object Ob is located and the received light intensity in the light detection unit 30 is proportional to the reflection intensity on the target object Ob. Therefore, the received light intensity in the light detection unit 30 takes a value corresponding to the position of the target object Ob. Then, as shown in FIG. 3B, a drive current when an amount of control (drive current) for the first detection light source unit 12A is adjusted and a drive current when an amount of control (drive current) for the second detection light source unit 12B is adjusted are adjusted so that a detection value LGa in the light detection unit 30 when the first light intensity distribution L2Ga is formed and a detection value LGb in the light detection unit 30 when the second light intensity distribution L2 Gb is formed may be equal. Then, using a ratio of the adjusted amount of control (drive current) for the first detection light source unit 12A to the adjusted amount of control (drive current) for the second detection light source unit 12B, a ratio between amounts of adjustment, or the like, where the target object Ob exists in the X-axis direction may be detected.

More specifically, as shown in FIG. 3B, the first light intensity distribution L2Ga and the second light intensity distribution L2 Gb are formed so that their light intensity distributions may be opposite to each other. In this state, if the detection values LGa, LGb in the light detection unit 30 are equal, it is known that the target object Ob is located at the center between the first detection light source unit 12A and the second detection light source unit 12B within the XY-plane. On the other hand, if the detection values LGa, LGb in the light detection unit 30 are different, the amounts of control (drive currents) for the first detection light source unit 12A and the second detection light source unit 12B are adjusted so that the detection values LGa, LGb may be equal, and the first light intensity distribution L2Ga and the second light intensity distribution L2 Gb are sequentially formed again as shown in FIG. 3B. As a result, if the detection values LGa, LGb in the light detection unit 30 become equal, using the ratio of the drive current for the first detection light source unit 12A to the drive current for the second detection light source unit 12B, where the target object Ob exists between the first detection light source unit 12A and the second detection light source unit 12B in the X-axis direction may be detected.

The detection principle will mathematically be explained using an optical path function. First, in the differential operation, given that the drive current for the first detection light source unit 12A is $I_A$ and the drive current for the second detection light source unit 12B is $I_b$ when the received light intensity in the light detection unit 30 is equal and a ratio of a distance function from the first detection light source unit 12A via the target object Ob to the light detection unit 30 to a distance function from the second detection light source unit 12B via the target object Ob to the light detection unit 30 is $P_{AB}$, the ratio $P_{AB}$ is obtained basically from the following equation:

$$P_{AB} = I_b/I_A.$$

Therefore, regarding the target object Ob, it is known that the target object Ob is located on an equal ratio line passing through the position in which a line connecting the first detection light source unit 12A and the second detection light source unit 12B is divided at a predetermined ratio.

The model will mathematically be explained. First, the respective parameters are given as follows:

T=reflectance of target object Ob;

$A_t$=distance function of detection light L2 output from first detection light source unit 12A, reflected by target object Ob, and reaching light detection unit 30;

A=received light intensity of light detection unit 30 when first detection light source unit 12A is turned on in state in which target object Ob exists in detection space 10R;

$B_t$=distance function of detection light L2 output from second detection light source unit 12B, reflected by target object Ob, and reaching light detection unit 30; and B=received light intensity of light detection unit 30 when second detection light source unit 12B is turned on in state in which target object Ob exists in detection space 10R. Note that light emission intensity of the first detection light source unit 12A and the second detection light source unit 12B is expressed by a product of the drive current and an emission coefficient, and the emission coefficient is set to "1" in the following explanation.

Further, if the above described differential operation is performed in the state in which the target object Ob exists in the detection space 10R, and the following relations are obtained:

$$A = T \times A_t \times I_A + \text{(environment light)} \quad (1)$$

$$B = T \times B_t \times I_b + \text{(environment light)} \quad (2).$$

Here, the received light intensity 30 in the differential operation is equal, the following equations are derived from Equation (1) and Equation (2):

$$I \times A_t \times I_A + \text{(environment light)} = T \times B_t \times I_b + \text{(environment light)}$$

$$T \times A_t \times I_A = T \times B_t \times I_b \quad (3).$$

Further, the ratio $P_{AB}$ of the distance functions $A_t$, $B_t$ is defined by the following equation:

$$P_{AB} = A_t / B_t \quad (4),$$

and from Eqs (3) and (4), the ratio $P_{AB}$ of the distance functions is expressed by the following equation:

$$P_{AB} = I_b / I_A \quad (5).$$

In Equation (5), there is no term of environment light or term of reflectance of the target object Ob. Thus, the environment light and the reflectance of the target object Ob have no influence on the ratio $P_{AB}$ of the distance functions $A_t$, $B_t$. Note that, regarding the mathematical model, correction for cancelling out the influence of the detection lights L2 that have not reflected by the target object Ob but enter or the like may be performed.

Here, the light source used in the detection light source unit 12 is a point light source and light intensity in a certain location is inversely proportional to the square of the distance from the light source. Therefore, a ratio of a separated distance P1 between the first detection light source unit 12A and the target object Ob to a separated distance P2 between the second detection light source unit 12B and the target object Ob is obtained by the following equation:

$$P_{AB} = (P1)^2 / (P2)^2.$$

Thus, regarding the target object Ob, it is known that the target object Ob exists on an equal ratio line passing through the position in which a hypothetical line connecting the first detection light source unit 12A and the second detection light source unit 12B is divided at P1:P2.

Differential operation between reference light Lr and detection light L2

Figure 4A:
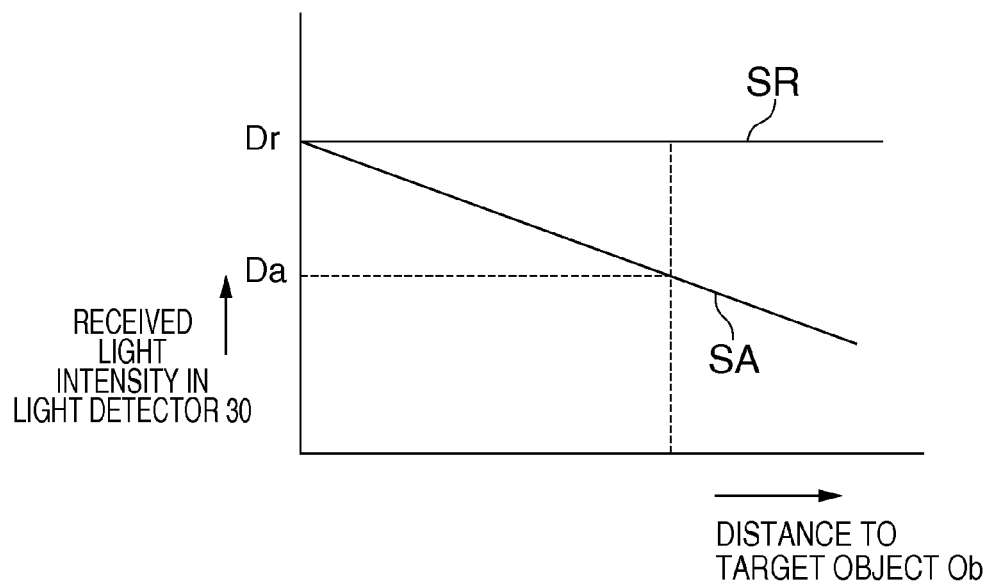
FIGS. 4A and 4B are explanatory diagrams showing a principle of detection of a position of a target object using a differential operation between reference light and detection light in the optical position detection device of the equipment with position detection function according to the first embodiment of the invention.
Figure 4B:
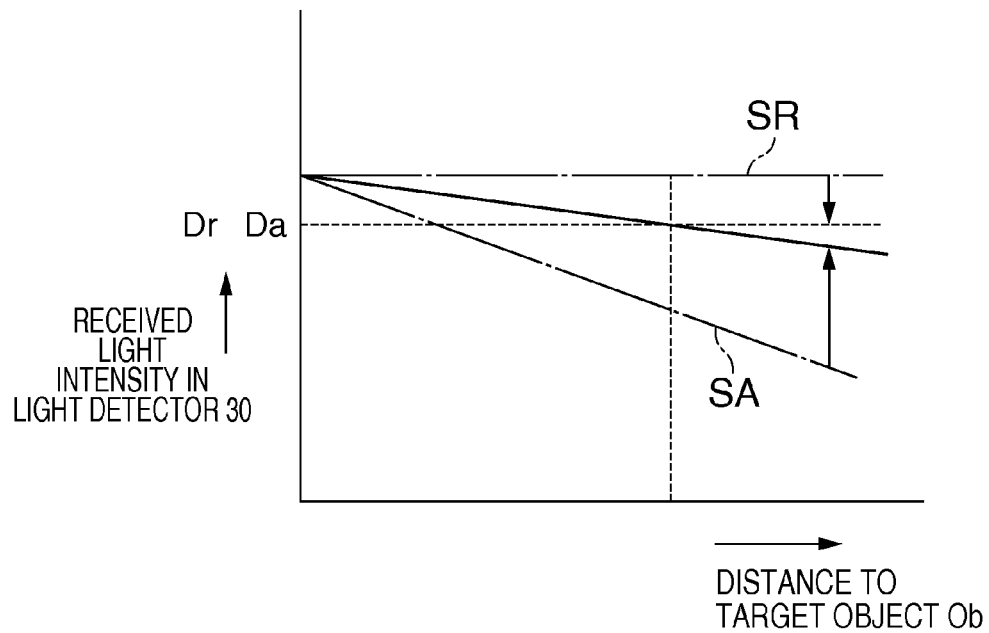

FIGS. 4A and 4B are explanatory diagrams showing a principle of detection of a position of the target object using a differential operation between the reference light Lr and the detection light L2 in the optical position detection device of the equipment with position detection function 1 according to the first embodiment of the invention, and FIGS. 4A and 4B are an explanatory diagram showing a relationship between the distance from the detection light source unit 12 to the target object Ob and the received light intensity of the detection light L2 and the like and an explanatory diagram showing a state after adjustment of the drive current to the light source.

In the optical position detection device 10 of the embodiment, using a differential operation between the detection light L2a and the reference light Lr and a differential operation between the detection light L2b and the reference light Lr in place of a direct differential operation between the detection lights L2a, L2b, the same result as that in the case where the detection lights L2a, L2b are differentially operated is finally derived. Here, the differential operation between the detection light L2a and the reference light Lr and the differential operation between the detection light L2b and the reference light Lr are executed in the following manner.

As shown in FIG. 4A, in the state in which the target object Ob exists in the detection space 10R, the distance from the first detection light source unit 12A via the target object Ob to the light detection unit 30 and received light intensity $D_a$ of the detection light L2a in the light detection unit 30 monotonically change as shown by a solid line SA. On the other hand, the received light intensity of the reference light Lr output from the reference light source 12R in the light detection unit 30 is constant regardless of the position of the target object Ob as shown by a solid line SR. Therefore, the received light intensity $D_a$ of the detection light L2a in the light detection unit 30 and the received light intensity $D_r$ of the reference light Lr in the light detection unit 30 are different.

Then, as shown in FIG. 4B, at least one of the drive current for the first detection light source unit 12A and the drive current for the reference light source 12R is adjusted, and the received light intensity $D_a$ of the detection light L2a in the light detection unit 30 and the received light intensity $D_r$ of the reference light Lr in the light detection unit 30 are made equal. The differential operation is performed between the reference light Lr and the detection light L2a and also performed between the reference light Lr and the detection light L2b. Therefore, the ratio and the difference between the drive current for the first detection light source unit 12A and the drive current for the second detection light source unit 12B may be obtained at the time when the received light intensity of the detection lights L2a, L2b in the light detection unit 30 and the received light intensity of the reference light Lr in the light detection unit 30 are equal. Using the ratio and the difference, where the target object Ob exists between the first detection light source unit 12A and the second detection light source unit 12B in the X-axis direction may be detected.

The detection principle will mathematically be explained using an optical path function. First, the respective parameters are given as follows:

T=reflectance of target object Ob;

$A_t$=distance function of detection light L2 output from first detection light source unit 12A, reflected by target object Ob, and reaching light detection unit 30;

A=received light intensity of light detection unit 30 when first detection light source unit 12A is turned on in state in which target object Ob exists in detection space 10R;

$B_t$=distance function of detection light L2 output from second detection light source unit 12B, reflected by target object Ob, and reaching light detection unit 30;

B=received light intensity of light detection unit 30 when second detection light source unit 12B is turned on in state in which target object Ob exists in detection space 10R;

$R_s$=optical path coefficient from reference light source 12R to light detection unit 30; and R=received light intensity of light detection unit 30 when only reference light source 12R is turned on. Note that light emission intensity of the first detection light source unit 12A, the second detection light source unit 12B, and the reference light source 12R is expressed by a product of the drive current and an emission coefficient, and the emission coefficient is set to "1" in the following explanation. Further, in the differential operation, given that the drive current for the first detection light source unit 12A is $I_A$, the drive current for the second detection light source unit 12B is $I_R$, and the drive current for the reference light source 12R is $I_R$ when the received light intensity in the light detection unit 30 is equal. Further, at the differential operation, the received light intensity of the light detection unit 30 when only the reference light source 12R is turned on is the same in the differential operation between the first detection light source unit 12A and itself and the second detection light source unit 12B and itself.

If the above described differential operation is performed in the state in which the target object Ob exists in the detection space 10R, the following relations are obtained:

$$A = T \times A_t \times I_A + \text{(environment light)} \quad (6)$$

$$B = T \times B_t \times I_B + \text{(environment light)} \quad (7)$$

$$R = R_s \times I_R + \text{(environment light)} \quad (8).$$

Here, the received light intensity 30 in the differential operation is equal, and the following equations are derived from Equation (6) and Equation (8):

$$T \times A_t \times I_A + \text{(environment light)} = R_s \times I_R + \text{(environment light)}$$

$$T \times A_t \times I_A = R_s \times I_R$$

$$T \times A_t = R_s \times I_R / I_A \quad (9), \text{ and}$$

the following equations are derived from Equation (7) and Equation (8):

$$T \times B_t \times I_B + \text{(environment light)} = R_s \times I_R + \text{(environment light)}$$

$$T \times B_t \times I_B = R_s \times I_R$$

$$T \times B_t = R_s \times I_R / I_B \quad (10).$$

Further, the ratio $P_{AB}$ of the distance functions $A_t$, $B_t$ is defined by the following equation:

$$P_{AB} = A_t / B_t \quad (11), \text{ and}$$

from Equation (9) and Equation (10), the ratio $P_{AB}$ of the distance functions is expressed by the following equation:

$$P_{AB} = I_B / I_A \quad (12).$$

In Equation (12), there is no term of environment light or term of reflectance of target object Ob. Thus, the environment light and the reflectance of the target object Ob have no influence on the $P_{AB}$ of the distance functions of $A_t$, $B_t$. Note that, regarding the mathematical model, correction for cancelling out the influence of the detection lights L2 that have not reflected by the target object Ob but enter or the like may be performed. Further, even in the case where the received light intensity of the light detection unit 30 when only the reference light source 12R is turned on is set to different values in the differential operation between the first detection light source unit 12A and itself and the differential operation between the second detection light source unit 12B and itself, basically, the same principle holds.

Here, the light source used in the detection light source unit 12 is a point light source and light intensity in a certain location is inversely proportional to the square of the distance from the light source. Therefore, a ratio of a separated distance P1 between the first detection light source unit 12A and the target object Ob to a separated distance P2 between the second detection light source unit 12B and the target object Ob is obtained by the following equation:

$$P_{AB} = (P1)^2 / (P2)^2.$$

Thus, regarding the target object Ob, it is known that the target object Ob is located on an equal ratio line passing through the position in which a hypothetical line connecting the first detection light source unit 12A and the second detection light source unit 12B is divided at P1:P2.

Detection Principle of Y-Coordinate Information and Determination of XY-Coordinates Next, a principle of detection of information on a Y-coordinate of the target object Ob will be explained. In the embodiment, the information on the Y-coordinate of the target object Ob is detected using the same differential operation as that in the method that has been explained with reference to FIGS. 4A and 4B. In this regard, the Y-coordinate information is obtained based on a result of the differential operation of the first detection light source unit 12A and the second detection light source unit 12B and the reference light source 12R. More specifically, in the state in which the target object Ob exists in the detection space 10R, when both the first detection light source unit 12A and the second detection light source unit 12B are turned on, there is a relation that monotonically changes between the position of the target object Ob in the Y-axis direction and the received light intensity of the detection light L2a in the light detection unit 30 like the relation shown by the solid SA in FIGS. 4A and 4B. Accordingly, at least one of the drive currents for the first detection light source unit 12A and the second detection light source unit 12B and the drive current for the reference light source 12R is adjusted, and the received light intensity of the detection light L2a in the light detection unit 30 and the received light intensity of the reference light Lr in the light detection unit 30 are made equal. In the differential operation, if the ratio and the difference between the drive current for the first detection light source unit 12A and the second detection light source unit 12B and the drive current for the reference light source 12R may be obtained at the time when the received light intensity of the detection lights L2a, L2b in the light detection unit 30 and the received light intensity of the reference light Lr in the light detection unit 30 are equal, where the target object Ob exists in the Y-axis direction may be detected.

Thus, using the X-coordinate information and the Y-coordinate information obtained using the above explained methods, the X-coordinate and the Y-coordinate of the target object Ob may be determined. More specifically, by obtaining an intersection of a line corresponding to the X-coordinate and a line corresponding to the Y-coordinate, the X-coordinate and the Y-coordinate of the target object Ob may be determined. Note that the concept of the intersection is for geometrical explanation of the position of the target object Ob, and, in practice, the X-coordinate and the Y-coordinate of the target object Ob are calculated by computation.

Configuration Example of Position Detection Unit 50 for Differential Operation

Figure 5A:
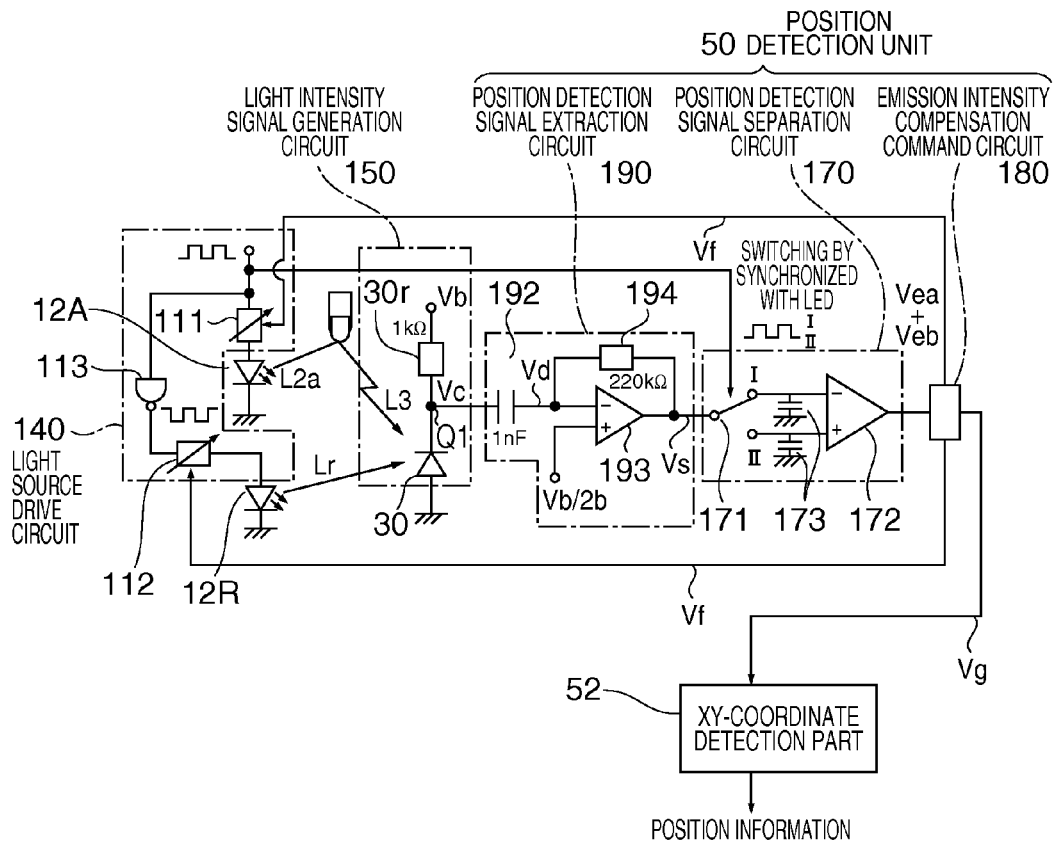
FIGS. 5A and 5B are explanatory diagrams showing processing performed in a position detection unit etc. in the optical position detection device of the equipment with position detection function according to the first embodiment of the invention.
Figure 5B:
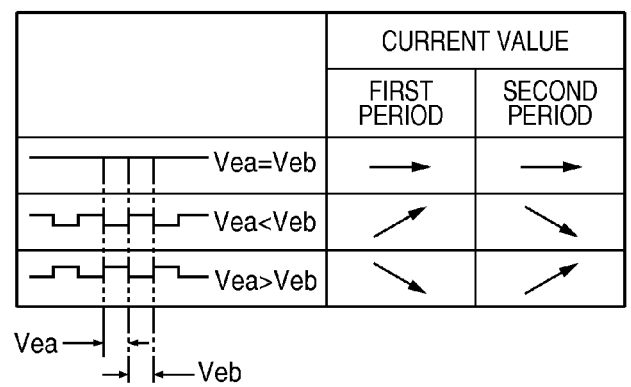

FIGS. 5A and 5B are explanatory diagrams showing processing performed in a position detection unit etc. in the optical position detection device 10 of the equipment with position detection function 1 according to the first embodiment of the invention.

For performance of the differential operation, a configuration of performing processing using a microprocessor unit (MPU) as the position detection unit 50 according to execution of predetermined software (operation program) may be employed. Further, as will be explained with reference to FIGS. 6A and 6B, a configuration of performing processing in a signal processing part using hardware of a logic circuit or the like may be employed. Note that, in FIGS. 5A and 5B, the differential operation explained with reference to FIGS. 4A and 4B is shown, however, by replacing the reference light source 12R by the detection light source unit 12, the configuration may be applied to the differential operation explained with reference to FIGS. 3A and 3B.

As shown in FIG. 5A, in the optical position detection device 10 of the embodiment, the light source drive circuit 140 applies drive pulses of a predetermined current value to the first detection light source unit 12A via a variable resistance 111, and applies drive pulses of a predetermined current value to the reference light source 12R via a variable resistance 112 and an inverting circuit 113. For the purpose, drive pulses in opposite phases are applied to the first detection light source unit 12A and the reference light source 12R, and the first detection light source unit 12A and the reference light source 12R are alternately turned on. Further, when the first detection light source unit 12A is turned on, of the detection light L2a, the light reflected by the target object Ob is received by the light detection unit 30, and, when the reference light source 12R is turned on, the reference light Lr is received by the light detection unit 30. In a light intensity signal generation circuit 150, a resistance 30r of about 1 kΩ is electrically connected in series to the light detection unit 30, and a bias voltage Vb is applied to ends of them.

In the light intensity signal generation circuit 150, the position detection unit 50 is electrically connected to a connection point Q1 of the light detection unit 30 and the resistance 30r. A detection signal Vc output from the connection point Q1 of the light detection unit 30 and the resistance 30r is expressed by the following equation:

$Vc = V30/(V30 + \text{resistance value of resistance } 30r)$

V30: equivalent resistance of light detection unit 30. Therefore, in comparison between the case where environment light Lc does not enter the light detection unit 30 and the case where the environment light Lc has entered the light detection unit 30, the level and the amplitude of the detection signal Vc are greater in the case where the environment light Lc has entered the light detection unit 30.

The position detection unit 50 generally includes a position detection signal extraction circuit 190, a position detection signal separation circuit 170, and an emission intensity compensation command circuit 180. The position detection signal extraction circuit 190 has a filter 192 including a capacitor of about 1 nF, and the filter 192 functions as a high-pass filter that removes a direct-current component from the signal output from the connection point Q1 of the light detection unit 30 and the resistance 30r. Accordingly, only a position detection signal Vd by the light detection unit 30 is extracted from the detection signal Vc output from the connection point Q1 of the light detection unit 30 and the resistance 30r by the filter 192. That is, while the detection light L2a and the reference light Lr are modulated, the intensity of the environment light Lc may be regarded constant within a certain period, and the low-frequency component or the direct-current component due to the environment light Lc is removed by the filter 192.

Further, the position detection signal extraction circuit 190 has an adder circuit 193 with a feedback resistance 194 of about 220 kΩ at the downstream of the filter 192, and the position detection signal Vd extracted by the filter 192 is output as a position detection signal Vs superimposed on the voltage V/2 of a half of the bias voltage Vb to the position detection signal separation circuit 170.

The position detection signal separation circuit 170 includes a switch 171 that performs a switching operation in synchronization with the drive pulses applied to the first detection light source unit 12A, a comparator 172, and capacitors 173 electrically connected respectively to input lines of the comparator 172. Accordingly, when the position detection signal Vs is input to the position detection signal separation circuit 170, an effective value Vea of the position detection signal Vs when the first detection light source unit 12A is turned on and an effective value Veb of the position detection signal Vs when the reference light source 12R is turned on are alternately output from the position detection signal separation circuit 170 to the emission intensity compensation command circuit 180.

The emission intensity compensation command circuit 180 compares the effective values Vea, Veb and performs processing shown in FIG. 5B, and outputs a control signal Vf to the light source drive circuit 140 so that the effective value Vea of the position detection signal Vs and the effective value Veb of the position detection signal Vs may be at the same level. That is, the emission intensity compensation command circuit 180 compares the effective value Vea of the position detection signal Vs to the effective value Veb of the position detection signal Vs, and, if they are equal, maintains the current drive condition. On the other hand, if the effective value Vea of the position detection signal Vs is lower than the effective value Veb of the position detection signal Vs, the emission intensity compensation command circuit 180 reduces the resistance value of the variable resistance 111 to increase the amount of output light from the first detection light source unit 12A. Further, if the effective value Veb of the position detection signal Vs is lower than the effective value Vea of the position detection signal Vs, the emission intensity compensation command circuit 180 reduces the resistance value of the variable resistance 112 to increase the amount of output light from the reference light source 12R.

In this manner, in the optical position detection device 10, using the emission intensity compensation command circuit 180 of the position detection unit 50, the amounts of control (drive currents) of the first detection light source unit 12A and the reference light source 12R are controlled so that amounts of detection by the light detection unit 30 in the turn-on operation of the first detection light source unit 12A and the turn-on operation of the reference light source 12R may be equal. Therefore, in the emission intensity compensation command circuit 180, information on the drive currents for the first detection light source unit 12A and the reference light source 12R that equalizes the amounts of detection by the light detection unit 30 in the turn-on operation of the first detection light source unit 12A and the turn-on operation of the reference light source 12R exists, and the information is output as a position detection signal Vg to the position detection unit 50. The same processing is performed between the second detection light source unit 12B and the reference light source 12R.

Main Advantages of the Embodiment

As explained above, in the optical position detection device 10 of the embodiment, the first detection light source unit 12A and the second detection light source unit 12B output the detection lights L2a, L2b from the one side Y1 toward the other side Y2 in the Y-axis direction, and parts of the detection lights L2a, L2b reflected by the target object Ob located in the detection space 10R are received by the light detection unit 30. Here, the first detection light source unit 12A and the second detection light source unit 12B are separated in the X-axis direction. Accordingly, by using the ratio and the difference of the current values after the current values to be supplied to the first detection light source unit 12A and the second detection light source unit 12B are adjusted so that the received light intensity in the light detection unit 30 when the first detection light source unit 12A is turned on and the received light intensity in the light detection unit 30 when the second detection light source unit 12B is turned on may be equal, the ratio of the distance in the X-axis direction from the first detection light source unit 12A to the target object Ob to the distance in the X-axis direction from the second detection light source unit 12B to the target object Ob is known.

Further, the first detection light source unit 12A and the second detection light source unit 12B are provided in the same position in the Y-axis direction. Accordingly, the position of the target object Ob in the Y-axis direction is known from the sum of the current values when the first detection light source unit 12A and the second detection light source unit 12B are driven so that the received light intensity in the light detection unit 30 when the first detection light source unit 12A and the second detection light source unit 12B are simultaneously turned on may take a predetermined value.

Thus, only by using two detection light source units (the first detection light source unit 12A and the second detection light source unit 12B) as the detection light source unit 12, the X-coordinate (the first position) and the Y-coordinate (the second position) of the target object Ob may be detected.

Further, in the embodiment, for detection of the Y-coordinate, the sum of the current values when the first detection light source unit 12A and the second detection light source unit 12B are driven so that the received light intensity in the light detection unit 30 when the first detection light source unit 12A and the second detection light source unit 12B are simultaneously turned on may take a predetermined value is used. Accordingly, even in the case where the target object Obis separated from the first detection light source unit 12A and the second detection light source unit 12B, the position of the target object Ob in the Y-axis direction may be detected and the detection target range of the Y-coordinate is wider.

Furthermore, in the embodiment, the reference light source 12R that outputs the reference light entering the light detection unit not via the output space (the detection space 10R) of the detection lights L2a, L2b is provided, and the position detection unit 50 detects the position of the target object Ob based on the result of the differential operation between the detection light source unit 12 and the reference light source 12R according to the received light result of the light detection unit 30. Accordingly, the Y-coordinate of the target object Ob may be detected without the influence of the environment light.

Moreover, the detection light source unit 12 (the first detection light source unit 12A and the second detection light source unit 12B) and the light detection unit 30 are integrated as the optical unit 18. Accordingly, there are advantages that the optical position detection device 10 may easily be added to various kinds of equipment etc.

In addition, the detection light L2 (the detection lights L2a, L2b) is infrared light, and the detection light L2 is not visually recognized. Therefore, even in the case where the optical position detection device 10 is provided in a display apparatus, display is not hindered, and the optical position detection device 10 may be used for various kinds of equipment.

Second Embodiment

Figure 6A:
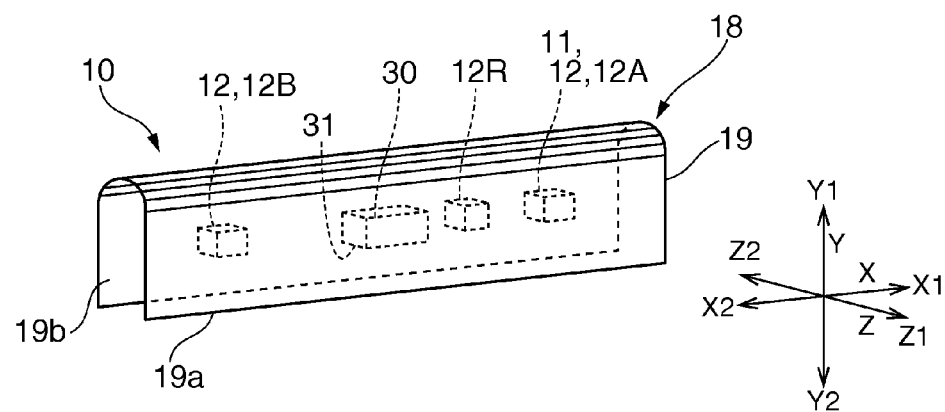
FIGS. 6A and 6B are explanatory diagrams schematically showing a main part of equipment with position detection function according to a second embodiment of the invention.
Figure 6B:
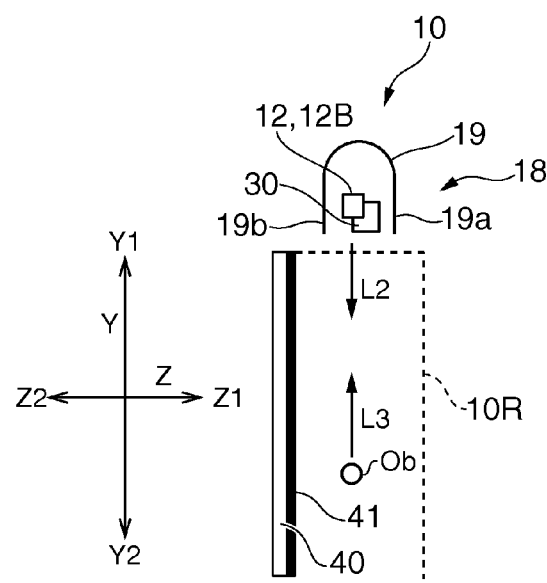

FIGS. 6A and 6B are explanatory diagrams schematically showing a main part of equipment with position detection function 1 according to the second embodiment of the invention, and FIGS. 6A and 6B are a perspective view of the housing 19 (light blocking member) provided in the optical unit 18 having the detection light source unit 12 and the light detection unit 30, and a side view thereof. Note that the basic configuration of the embodiment is the same as that of the first embodiment, and the same signs are assigned to show the common parts and their explanation will be omitted.

As shown in FIGS. 6A and 6B, the optical position detection device 10 used for the equipment with position detection function 1 of the embodiment includes the light source 11 having plural detection light source units 12 that output detection lights L2 from the one side Y1 toward the other side Y2 in the Y-axis direction, and the light detection unit 30 at the one side Y1 in the Y-axis direction with the light receiving part 31 directed toward the other side Y2 as is the case of the first embodiment. The visual surface component member 40 includes a sheet-like or plate-like light transmissive member or the like and has the visual surface 41 spreading along the X-axis direction and the Y-axis direction.

The light source 11 includes the first detection light source unit 12A and the second detection light source unit 12B at the one side Y1 in the Y-axis direction along the side part extending in the X-axis direction in the visual surface component member 40. The first detection light source unit 12A and the second detection light source unit 12B are separated in the X-axis direction and located in the same position in the Y-axis direction.

Further, the optical position detection device 10 includes the light detection unit 30 at the one side Y1 in the Y-axis direction in the side part extending in the X-axis direction in the visual surface component member 40. In the embodiment, the light detection unit 30 is provided between the first detection light source unit 12A and the second detection light source unit 12B, and separated from each of the first detection light source unit 12A and the second detection light source unit 12B in the X-axis direction and located in the same position as those of the first detection light source unit 12A and the second detection light source unit 12B in the Y-axis direction. Accordingly, the first detection light source unit 12A, the reference light source 12R, the light detection unit 30, and the second detection light source unit 12B are arranged in this order on the same straight line in the X-axis direction. Further, the light detection unit 30, the first detection light source unit 12A, and the second detection light source unit 12B are located to project from the visual surface component member 40 toward the one side Z1 in the Z-axis direction.

Here, the light detection unit 30 and the light source 11 are held in the light blocking housing 19 (light blocking member) and integrated as the optical unit 18. In the embodiment, the housing 19 has a U-shaped section with its opening end directed toward the other side Y2 in the Y-axis direction, and light blocking front plate part 19a and rear plate part 19b are located at the one side Z1 and the other side Z2 in the Z-axis direction with respect to the first detection light source unit 12A, the reference light source 12R, the light detection unit 30, and the second detection light source unit 12B.

Therefore, according to the embodiment, the output space (detection space 10R) of the detection lights L2 may be limited in the Z-axis direction. Thus, only the position (X-coordinate and Y-coordinate) of the target object Ob located within a predetermined range in the Z-axis direction may be detected.

Third Embodiment

Figure 7A:
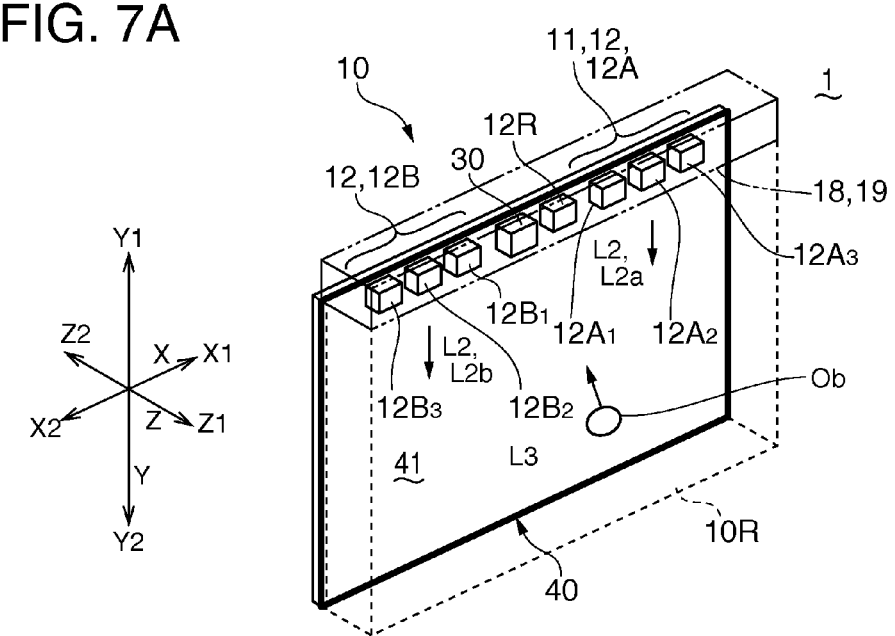
FIGS. 7A and 7B are explanatory diagrams schematically showing a main part of equipment with position detection function according to a third embodiment of the invention.
Figure 7B:
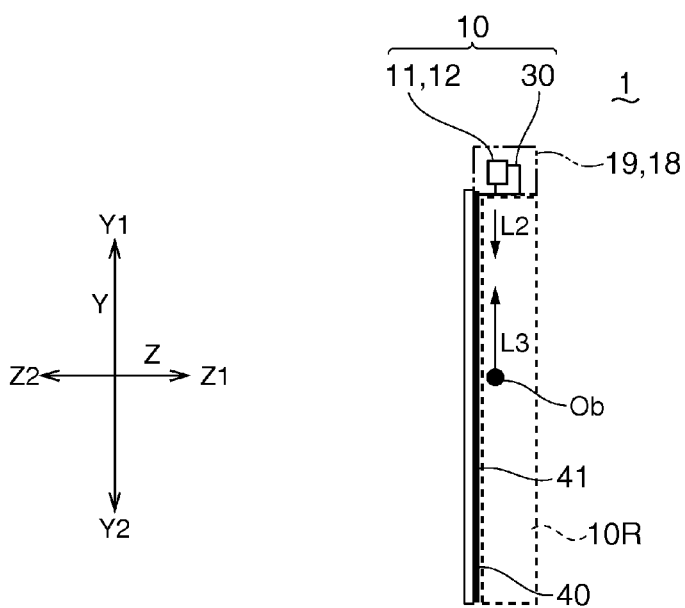
Figure 8A:
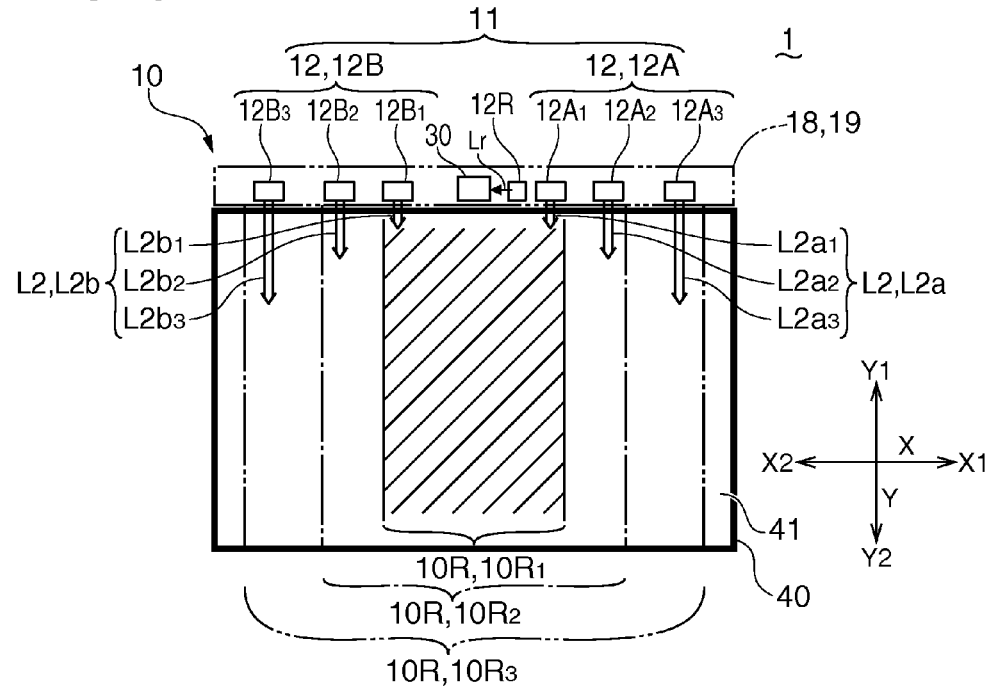
FIGS. 8A and 8B are explanatory diagrams showing a configuration of a light source etc. of an optical position detection device used for the equipment with position detection function according to the third embodiment of the invention.
Figure 8B:
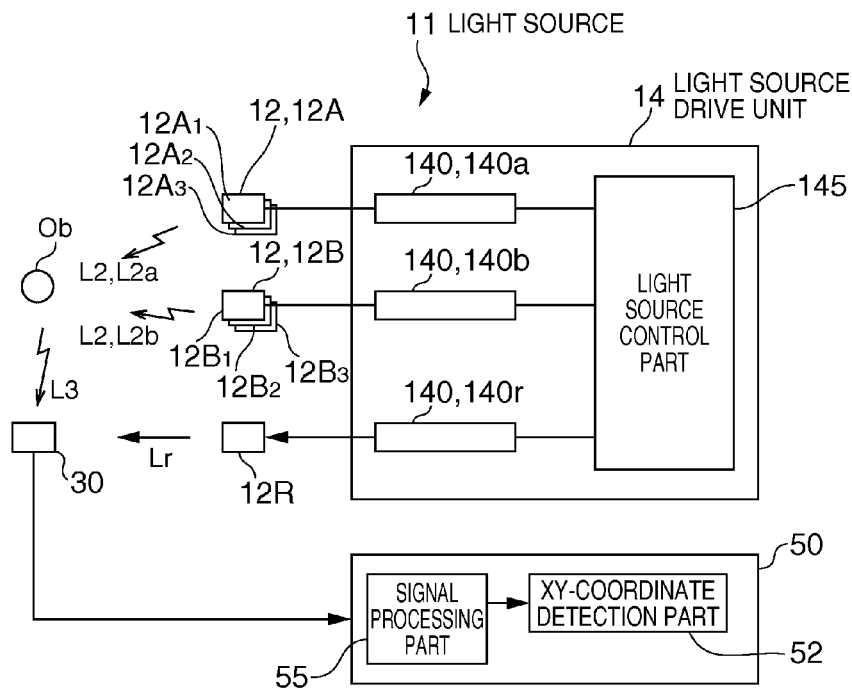

FIGS. 7A and 7B are explanatory diagrams schematically showing a main part of equipment with position detection function 1 according to the third embodiment of the invention, and FIGS. 7A and 7B are an explanatory diagram of the detection light source units 12 seen from the detection light L2 output space side and an explanatory diagram of the detection light source units 12 seen from the lateral side. FIGS. 8A and 8B are explanatory diagrams showing a configuration of a light source unit etc. of an optical position detection device used for the equipment with position detection function according to the third embodiment of the invention, and FIGS. 8A and 8B are a plan view of the detection light source unit seen from the output space of the detection light and an explanatory diagram showing an electric configuration.

As shown in FIGS. 7A, 7B, 8A, and 8B, the optical position detection device 10 used for the equipment with position detection function 1 of the embodiment also includes the light source 11 having plural detection light source units 12 that output detection lights L2 from the one side Y1 toward the other side Y2 in the Y-axis direction, and the light detection unit 30 at the one side Y1 in the Y-axis direction with the light receiving part 31 directed toward the other side Y2 as is the case of the first embodiment. The visual surface component member 40 includes a sheet-like or plate-like light transmissive member or the like and has the visual surface 41 spreading along the X-axis direction and the Y-axis direction.

The light source 11 includes the first detection light source unit 12A and the second detection light source unit 12B at the one side Y1 in the Y-axis direction along the side part extending in the X-axis direction in the visual surface component member 40. The first detection light source unit 12A and the second detection light source unit 12B are separated in the X-axis direction and located in the same position in the Y-axis direction.

Further, the optical position detection device 10 includes the light detection unit 30 at the one side Y1 in the Y-axis direction in the side part extending in the X-axis direction in the visual surface component member 40. In the embodiment, the light detection unit 30 is provided between the first detection light source unit 12A and the second detection light source unit 12B, and separated from each of the first detection light source unit 12A and the second detection light source unit 12B in the X-axis direction and located in the same position as those of the first detection light source unit 12A and the second detection light source unit 12B in the Y-axis direction. Accordingly, the first detection light source unit 12A, the reference light source 12R, the light detection unit 30, and the second detection light source unit 12B are arranged in this order on the same straight line in the X-axis direction. Furthermore, the light detection unit 30, the first detection light source unit 12A, and the second detection light source unit 12B are located to project from the visual surface component member 40 toward the one side Z1 in the Z-axis direction. Here, the light detection unit 30 and the light source 11 are held in the housing 19 and integrated as the optical unit 18.

In the optical position detection device 10 of the embodiment, the first detection light source unit 12A has plural light emitting devices arranged in the X-axis direction. More specifically, the first detection light source unit 12A has a first light emitting device $12A_1$ at the innermost side, a second light emitting device $12A_2$ located at the opposite side (outer side) to the side at which the light detection unit 30 is located with respect to the first light emitting device $12A_1$, and a third light emitting device $12A_3$ located at the opposite side (outer side) to the side at which the light detection unit 30 is located with respect to the second light emitting device $12A_2$. Here, the first light emitting device $12A_1$ to the third light emitting device $12A_3$ and the light detection unit 30 are arranged on the same straight line. Further, the center optical axes of the first light emitting device $12A_1$ to the third light emitting device $12A_3$ are in juxtaposition with one another, and, in the embodiment, the center optical axes of the first light emitting device $12A_1$ to the third light emitting device $12A_3$ are in parallel to one another. The second detection light source unit 12B also has plural light emitting devices arranged in the X-axis direction like the first detection light source unit 12A. More specifically, the second detection light source unit 12B has a first light emitting device $12B_1$ at the innermost side, a second light emitting device $12B_2$ located at the opposite side (outer side) to the side at which the light detection unit 30 is located with respect to the first light emitting device $12B_1$, and a third light emitting device $12B_3$ located at the opposite side (outer side) to the side at which the light detection unit 30 is located with respect to the second light emitting device $12B_2$. Here, the first light emitting device $12B_1$ to the third light emitting device $12B_3$ and the light detection unit 30 are arranged on the same straight line. Further, the center optical axes of the first light emitting device $12B_1$ to the third light emitting device $12B_3$ are in juxtaposition with one another, and, in the embodiment, the center optical axes of the first light emitting device $12B_1$ to the third light emitting device $12B_3$ are in parallel to one another.

Each of the first light emitting devices $12A_1$, $12B_1$, the second light emitting devices $12A_2$, $12B_2$, and the third light emitting devices $12A_3$, $12B_3$ includes an LED (light emitting diode) or the like, and emits the detection light L2 (detection light L2a, L2b) of infrared light having a peak wavelength from 840 to 1000 nm as a divergent light.

As shown in FIG. 8B, in the light source 11, the light source drive unit 14 includes the light source drive circuit 140 that drives the detection light source units 12 and the reference light source 12R, and the light source control part 145 that controls turn-on patterns of the respective plural detection light source units 12 and reference light source 12R via the light source drive circuit 140. The light source drive circuit 140 includes the light source drive circuits 140a, 140b that drive the first detection light source unit 12A and the second detection light source unit 12B, and the light source drive circuit 140r that drives the reference light source 12R. Further, the light source drive circuits 140a, 140b respectively and individually drive the first light emitting devices $12A_1$, $12B_1$, the second light emitting devices $12A_2$, $12B_2$, and the third light emitting devices $12A_3$, $12B_3$.

In the optical position detection device 10 of the embodiment, the light source drive unit 14 executes a first mode in which only the first light emitting device $12A_1$ is turned on and a second mode in which the light emitting device at least other than that in the first mode of the plural light emitting devices is turned on in the first detection light source unit 12A. In the embodiment, the light source drive unit 14 turns on the plural light emitting devices containing the first light emitting device $12A_1$ in the second mode. Further, the light source drive unit 14 executes a first mode in which only the first light emitting device $12B_1$ is turned on and a second mode in which the light emitting device at least other than that in the first mode of the plural light emitting devices is turned on in the second detection light source unit 12B. In the embodiment, the light source drive unit 14 turns on the plural light emitting devices containing the first light emitting device $12B_1$ in the second mode.

Accordingly, in the embodiment, if it is known that the target object Ob exists in a narrower range, the first mode is performed and the detection space 10R is set to the narrower range. On the other hand, if it is known that the target object Ob exists in a wider range, the seconds mode is performed and the detection space 10R is expanded. More specifically, in the case where the X-coordinate of the target object Ob is detected using the first detection light source unit 12A and the second detection light source unit 12B, if it is known that the target object Ob exists in the narrower range, as shown in FIG. 8A, the light source drive unit 14 turns on only the first light emitting devices $12A_1$, $12B_1$ and allows the first light emitting devices $12A_1$, $12B_1$ to output detection lights $L2a_1$ (L2a), $L2b_1$ (L2b) as detection lights L2 (first mode). The size of the detection space 10R in the X-axis direction in this state is a detection space $10R_1$ shaded with rising diagonal lines from bottom left to top right in FIG. 8A.

Further, if it may be possible that the target object Ob exists in a slightly wider range, the light source drive unit 14 turns on the first light emitting devices $12A_1$, $12B_1$ and the second light emitting devices $12A_2$, $12B_2$ (second mode). As a result, the first light emitting devices $12A_1$, $12B_1$ output detection lights $L2a_1$, $L2b_1$ and the second light emitting devices $12A_2$, $12B_2$ output detection lights $L2a_2$, $L2b_2$. The detection lights $L2a_1$, $L2a_2$ are output as a continuous integrated detection light $L2a$, and the detection lights $L2b_1$, $L2b_2$ are output as a continuous integrated detection light $L2b$. The size of the detection space 10R in the X-axis direction in this state is expanded to a detection space $10R_2$.

Furthermore, if it may be possible that the target object Ob exists in an even wider range, the light source drive unit 14 turns on the first light emitting devices $12A_1$, $12B_1$, the second light emitting devices $12A_2$, $12B_2$, and the third light emitting devices $12A_3$, $12B_3$ (second mode). As a result, the first light emitting devices $12A_1$, $12B_1$ output detection lights $L2a_1$, $L2b_1$, the second light emitting devices $12A_2$, $12B_2$ output detection lights $L2a_2$, $L2b_2$, and the third light emitting devices $12A_3$, $12B_3$ output detection lights $L2a_3$, $L2b_3$. The detection lights $L2a_1$, $L2a_2$, $L2a_3$ are output as a continuous integrated detection light $L2a$, and the detection lights $L2b_1$, $L2b_2$, $L2b_3$ are output as a continuous integrated detection light $L2b$. The size of the detection space 10R in the X-axis direction in this state is expanded to a detection space $10R_3$.

Thus, in the optical position detection device 10 of the equipment with position detection function 1 of the embodiment, if the detection space 10R of the target object Ob is set larger, the output space may be made larger by increasing the number of light emitting devices to be turned on, and, on the other hand, if the detection space 10R of target object Ob is set smaller, the output space may be made smaller by decreasing the number of light emitting devices to be turned on. Therefore, the power to turn on the light sources is not wasted and power consumption may be reduced. Particularly, in the embodiment, the light source drive unit 14 can execute the first mode in which one light emitting device of the plural light emitting devices is turned on, and the detection space 10R may be made smaller to the minimum and the power consumed for turning on the light sources may significantly be reduced. Further, the output space (detection space 10R) of the detection lights L2 is variable, and only the target object Ob within a specific small space may be detected.

Fourth Embodiment

Figure 9A:
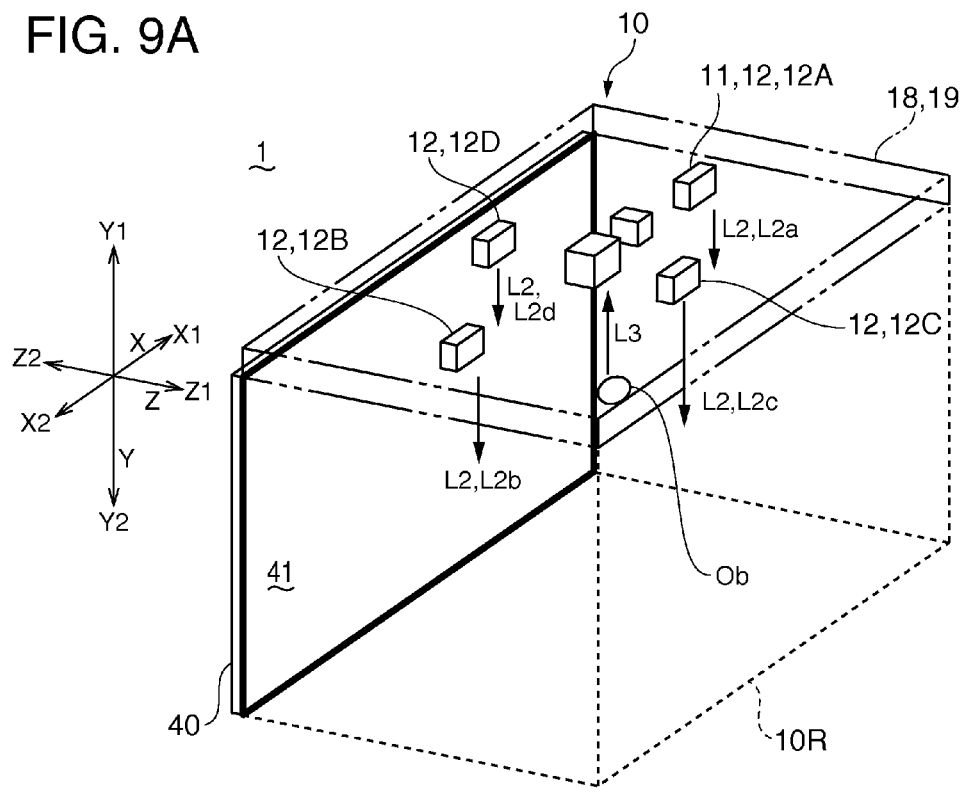
FIGS. 9A and 9B are explanatory diagrams schematically showing a main part of equipment with position detection function according to a fourth embodiment of the invention.
Figure 9B:
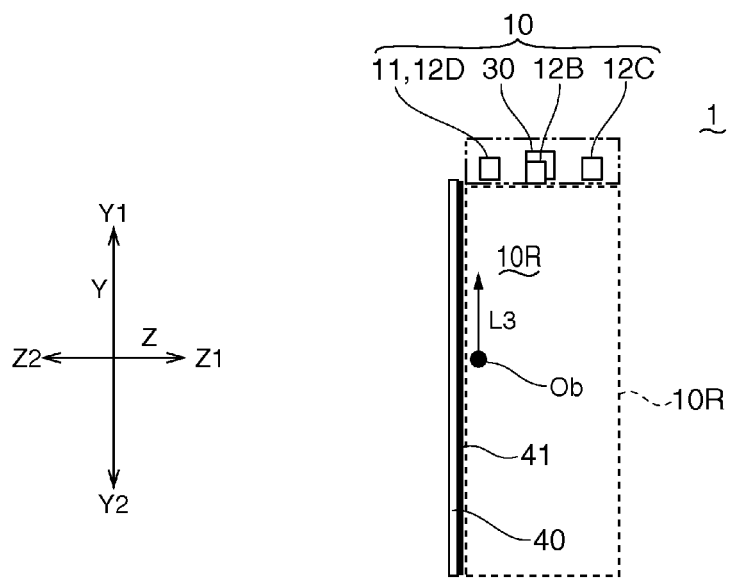
Figure 10:
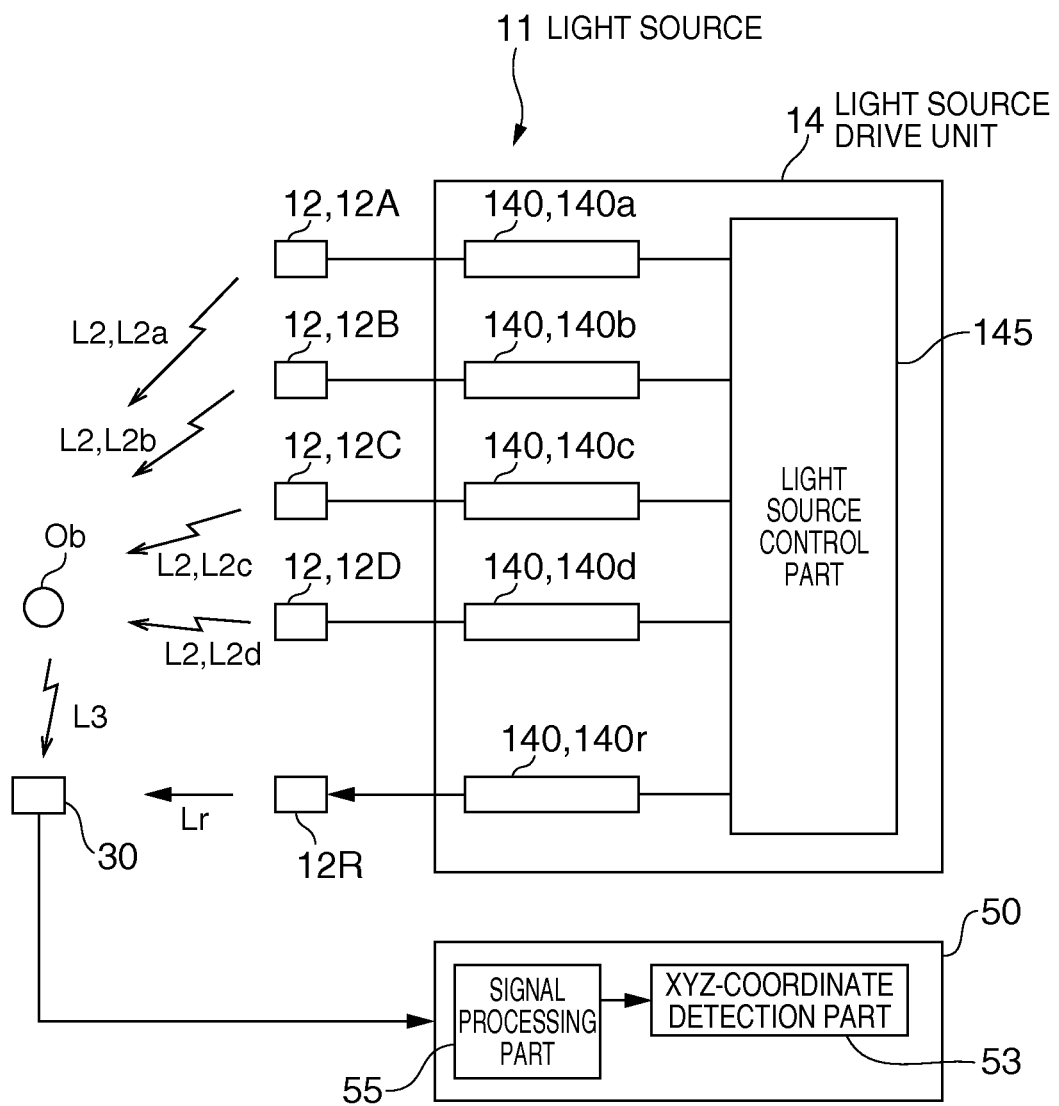
FIG. 10 is an explanatory diagram showing an electric configuration of a light source of an optical position detection device used for the equipment with position detection function according to the fourth embodiment of the invention.

FIGS. 9A and 9B are explanatory diagrams schematically showing a main part of equipment with position detection function 1 according to the fourth embodiment of the invention, and FIGS. 9A and 9B are an explanatory diagram of detection light source units 12 seen from the output space side of the detection lights L2 and an explanatory diagram of detection light source units 12 seen from the lateral side. FIG. 10 is an explanatory diagram showing an electric configuration of a light source 11 of an optical position detection device 10 used for the equipment with position detection function 1 according to the fourth embodiment of the invention.

As shown in FIGS. 9A, 9B, and 10, the optical position detection device 10 used for the equipment with position detection function 1 of the embodiment also includes the light source 11 having plural detection light source units 12 that output detection lights L2 from the one side Y1 toward the other side Y2 in the Y-axis direction, and the light detection unit 30 at the one side Y1 in the Y-axis direction with the light receiving part 31 directed toward the other side Y2 as is the case of the first embodiment. The visual surface component member 40 includes a sheet-like or plate-like light transmissive member or the like and has the visual surface 41 spreading along the X-axis direction and the Y-axis direction.

The light source 11 includes the first detection light source unit 12A and the second detection light source unit 12B at the one side Y1 in the Y-axis direction along the side part extending in the X-axis direction in the visual surface component member 40. The first detection light source unit 12A and the second detection light source unit 12B are separated in the X-axis direction and located in the same position in the Y-axis direction.

Further, the optical position detection device 10 includes the light detection unit 30 at the one side Y1 in the Y-axis direction in the side part extending in the X-axis direction in the visual surface component member 40. In the embodiment, the light detection unit 30 is provided between the first detection light source unit 12A and the second detection light source unit 12B, and separated from each of the first detection light source unit 12A and the second detection light source unit 12B in the X-axis direction and located in the same position as those of the first detection light source unit 12A and the second detection light source unit 12B in the Y-axis direction. Accordingly, the first detection light source unit 12A, the reference light source 12R, the light detection unit 30, and the second detection light source unit 12B are arranged in this order on the same straight line in the X-axis direction.

In the optical position detection device 10 of the embodiment, the light source 11 includes a third detection light source unit 12C and a fourth detection light source unit 12D separated in the Z-axis direction and provided in the same positions as each other in the X-axis direction and the Y-axis direction. Here, the third detection light source unit 12C and the fourth detection light source unit 12D are in the same position as that of the light detection unit 30 in the X-axis direction, and in the same position as those of the first detection light source unit 12A, the reference light source 12R, the light detection unit 30, and the second detection light source unit 12B in the Y-axis direction. Accordingly, the third detection light source unit 12C, the light detection unit 30, and the fourth detection light source unit 12D are arranged in this order on the same straight line in the Z-axis direction. The center optical axes of the third detection light source unit 12C and the fourth detection light source unit 12D are in juxtaposition with each other, and, in the embodiment, the center optical axes of the third detection light source unit 12C and the fourth detection light source unit 12D are in parallel to the center optical axes of the first detection light source unit 12A and the second detection light source unit 12B. Each of the third detection light source unit 12C and the fourth detection light source unit 12D includes an LED (light emitting diode) or the like, and emits the detection light L2 (detection light L2a, L2b) of infrared light having a peak wavelength from 840 to 1000 nm as a divergent light like the first detection light source unit 12A and the second detection light source unit 12B. Further, the first detection light source unit 12A, the second detection light source unit 12B, the third detection light source unit 12C, the fourth detection light source unit 12D, the reference light source 12R, and the light detection unit 30 are located to project from the visual surface component member 40 toward the one side Z1 in the Z-axis direction. Here, the light detection unit 30 and the light source 11 are held in the housing 19 and integrated as the optical unit 18.

As shown in FIG. 10, in the optical position detection device 10 of the embodiment, the light source drive unit 14 includes the light source drive circuit 140 that drives the detection light source units 12 and the reference light source 12R, and the light source control part 145 that controls turn-on patterns of the respective plural detection light source units 12 and reference light source 12R via the light source drive circuit 140. The light source drive circuit 140 includes light source drive circuits 140a, 140b, 140c, 140d that drive the first detection light source unit 12A to the fourth detection light source unit 12D and the light source drive circuit 140r that drives the reference light source 12R. The position detection unit 50 is electrically connected to the light detection unit 30, and a detection result in the light detection unit 30 is output to the position detection unit 50. The position detection unit 50 includes the signal processing part 55 for detection of the position of the target object Ob based on the detection result in the light detection unit 30, and an XYZ-coordinate detection part 53 that detects an X-coordinate (a position in a first direction (a first position)), a Y-coordinate (a position in a second direction (a second position)), and a Z-coordinate (a position in a third direction (a third position)). Thus formed position detection unit 50 and light source drive unit 14 operate in coordination with each other and perform position detection.

In the optical position detection device 10 having the above described configuration, as has been explained in the first embodiment, the X-coordinate and the Y-coordinate of the target object Ob may be detected using the first detection light source unit 12A, the second detection light source unit 12B, and the reference light source 12R. Further, on the same principle as the principle that has been explained in the first embodiment, the Z-coordinate of the target object Ob may be detected using the differential operation of the third detection light source unit 12C, the fourth detection light source unit 12D, and the reference light source 12R.

Specific Example 1 of Equipment with Position Detection Function 1

Figure 11:
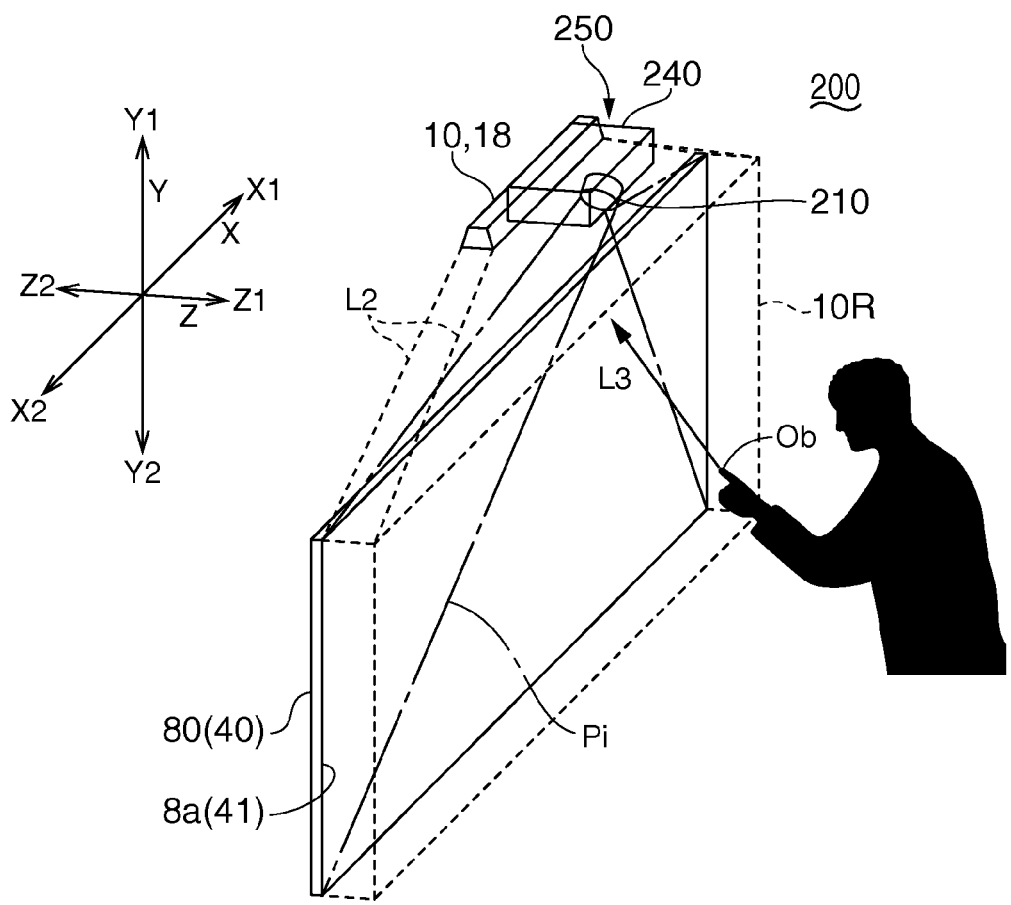
FIG. 11 is an explanatory diagram of specific example 1 of the equipment with position detection function to which the embodiment of the invention is applied (a projection-type display apparatus with position detection function).

Referring to FIG. 11, an example of forming the equipment with position detection function 1 to which the embodiment of the invention is applied as a projection-type display apparatus using a screen as the visual surface component member 40 will be explained. FIG. 11 is an explanatory diagram of specific example 1 of the equipment with position detection function 1 to which the embodiment of the invention is applied (the projection-type display apparatus with position detection function). Note that, in the equipment with position detection function 1 of the embodiment, the configuration of the optical position detection device 10 is the same as the configurations explained with reference to FIGS. 1A to 10, and the same signs are assigned to shown the common parts and their explanation will be omitted.

The equipment with position detection function 1 shown in FIG. 11 is a projection-type display apparatus with position detection function 200 in which an image is projected on a screen 80 (the visual surface component member 40) from an image projection device 250 (image generation device) referred to as a liquid crystal projector or digital micromirror device. In the projection-type display apparatus with position detection function 200, the image projection device 250 enlarges and projects image representation light Pi from a projection lens system 210 provided in a casing 240 toward a screen 80. Here, the image projection device 250 projects the image representation light Pi from a direction slightly tilted relative to the Y-axis direction toward a screen apparatus 8. Therefore, the visual surface 41 on which information is visually recognized is formed by a screen surface 8a on which the image is projected in the screen 80.

In the screen apparatus with position detection function 8, the optical position detection device 10 (the optical unit 18) is integrally formed with the image projection device 250. Accordingly, the optical position detection device 10 outputs detection light L2 along the screen surface 8a and detects detection light L3 reflected by the target object Ob. Therefore, by moving the target object Ob such as a finger tip closer to a part of the image projected on the screen 80, the position of the target object Ob may be detected, and the position of the target object Ob may be utilized as input information of a switching command of the image or the like.

Specific Example 2 of Equipment with Position Detection Function 1

Figure 12:
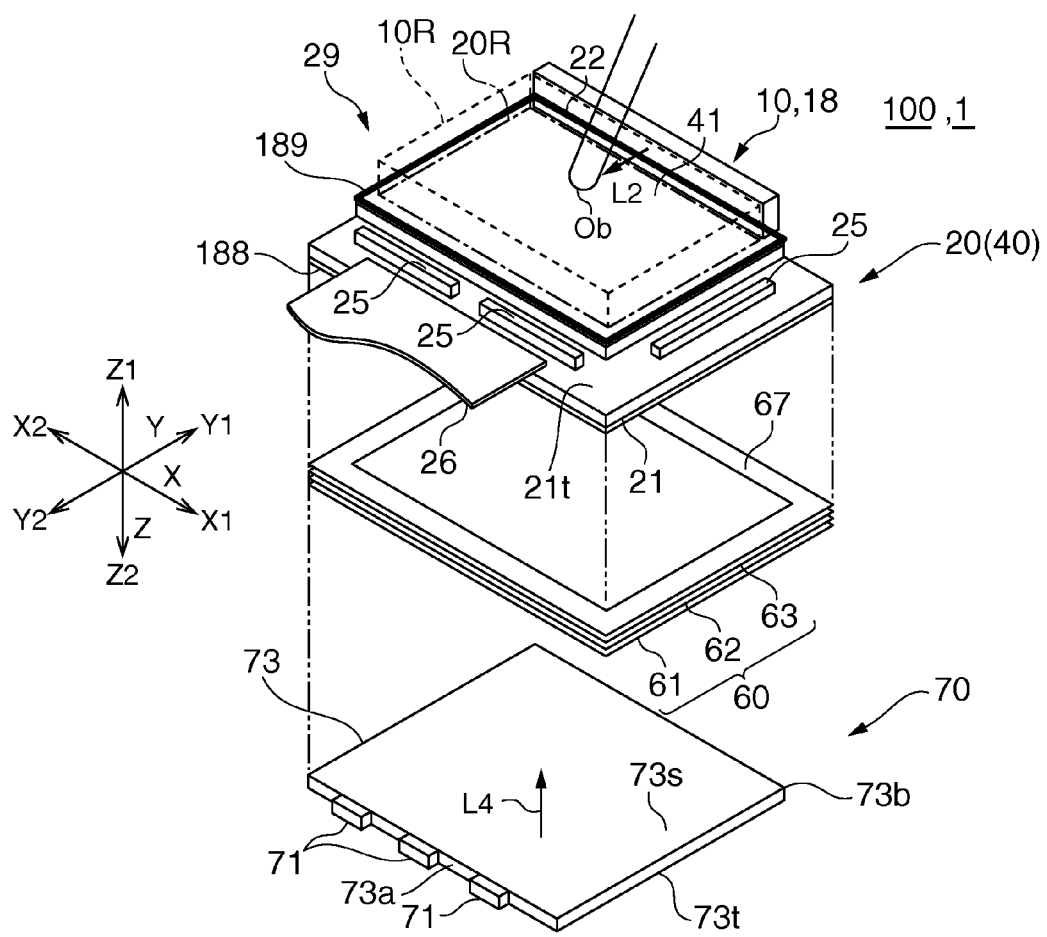
FIG. 12 is an exploded perspective view of specific example 2 of the equipment with position detection function to which the embodiment of the invention is applied (a direct-view-type display apparatus with position detection function).

Referring to FIG. 12, an example of forming the equipment with position detection function 1 as a direct-view-type display apparatus with position detection function using a direct-view-type image generation device as the visual surface component member 40 of the equipment with position detection function 1 will be explained. FIG. 12 is an exploded perspective view of specific example 2 of the equipment with position detection function to which the embodiment of the invention is applied (the direct-view-type display apparatus with position detection function). Note that, in the equipment with position detection function 1 (the direct-view-type display apparatus with position detection function) of the embodiment, the configuration of the optical position detection device 10 is the same as the configurations explained with reference to FIGS. 1A to 10, and the same signs are assigned to shown the common parts and their explanation will be omitted.

The direct-view-type display apparatus with position detection function 100 (the equipment with position detection function 1) shown in FIG. 12 includes the optical position detection device 10 explained with reference to FIGS. 1A to 10 and a liquid crystal device 20 (the direct-view-type display device/the visual surface component member 40) as the image generation device, and the visual surface 41 on which information is visually recognized is formed by one surface of the liquid crystal device 20. In the direct-view-type display apparatus with position detection function 100, the liquid crystal device 20 includes an image display region 20R on the visual surface 41, and the image display region 20R is superimposed on the detection space 10R when seen from the Z-axis direction.

The liquid crystal device 20 includes a liquid crystal panel 29. The liquid crystal panel 29 is a transmissive-type liquid crystal panel, and has a structure formed by bonding two light-transmissive substrates 21, 22 with a sealing material and filling the space between the substrates with a liquid crystal layer. The liquid crystal panel 29 is an active matrix liquid crystal panel, and light-transmissive pixel electrodes, data lines, scan lines, pixel switching elements (not shown) are formed on one of the two light-transmissive substrates 21, 22 and a light-transmissive common electrode (not shown) is formed on the other. Note that the pixel electrodes and the common electrode may be formed on the same substrate. In the liquid crystal panel 29, when scan signals are output via the scan lines to the respective pixels and image signals are output via the data lines, the orientation of the liquid crystal layer is controlled in the respective plural pixels, and, as a result, an image is formed in the image display region 20R. In the liquid crystal panel 29, on the one light-transmissive substrate 21, a substrate protruding part 21t protruding from the outer shape of the other light-transmissive substrate 22 toward the outside is provided. On the surface of the substrate protruding part 21t, electronic components 25 forming the drive circuits etc. are mounted. Further, a wiring member 26 such as a flexible printed circuit board (FPC) is connected to the substrate protruding part 21t. Note that only the wiring member 26 may be mounted on the substrate protruding part 21t. In the liquid crystal panel 29, a first polarizer 188 is provided thereon at the opposite side to the output side of representation light, and a second polarizer 189 is provided thereon at the output side of representation light.

The liquid crystal device 20 includes an illumination unit 70 for illumination of the liquid crystal panel 29. In the embodiment, the illumination unit 70 includes an illumination light source 71 and an illumination light guide plate 73 that outputs illumination light emitted from the illumination light source 71 while propagating it, and the illumination light guide plate 73 has a rectangular planar shape. The illumination light source 71 includes a light emitting device such as an LED (light emitting diode), for example, and emits white illumination light L4, for example, in response to a drive signal output from a drive circuit (not shown). In the embodiment, a plurality of the illumination light source 71 are arranged along a side part 73a of the illumination light guide plate 73.

In the illumination unit 70, the illumination light output from the illumination light source 71 enters the illumination light guide plate 73 from the side part 73a of the illumination light guide plate 73, and then, propagates within the illumination light guide plate 73 toward an outer peripheral part 73b and is output from a light output part 73s as one surface. Here, the illumination light guide plate 73 has a light guide structure in which the ratio of light amount of the output light from the light output part 73s to the internal propagation light from the side part 73a side to the opposite outer peripheral part 73b monotonically increases. The light guide structure is realized by gradually increasing an area of a refracting surface having a micro concave-convex shape for light deflection or light scattering formed on the light output part 73s or a rear surface 73t of the illumination light guide plate 73, formation density of a printed scattering layer, or the like toward the internal propagation direction. By providing the light guide structure, the illumination light L4 entering from the side part 73a is output from the light output part 73s nearly homogeneously.

In the liquid crystal device 20, an optical sheet 60 is provided between the illumination unit 70 and the liquid crystal panel 29. In the embodiment, as the optical sheet 60, a first prism sheet 61, a second prism sheet 62, and a light scattering plate 63 are sequentially laminated. Note that a light blocking sheet 67 having a rectangular frame shape is provided on the optical sheet 60, and the light blocking sheet 67 prevents leakage of the detection light L2.

In the direct-view-type display apparatus with position detection function 100 having the above described configuration, the optical position detection device 10 outputs the detection light L2 to the detection space 10R located at the visual surface 41 side in the liquid crystal device 20 (visual surface component member 40), and detects the light reflected by the target object Ob. Therefore, in the direct-view-type display apparatus with position detection function 100, the position of the target object Ob may be detected, and predetermined information input may be performed by indicating the image displayed on the liquid crystal device 20 with the target object Ob such as a finger tip.

Specific Example 3 of Equipment with Position Detection Function 1

Figure 13A:
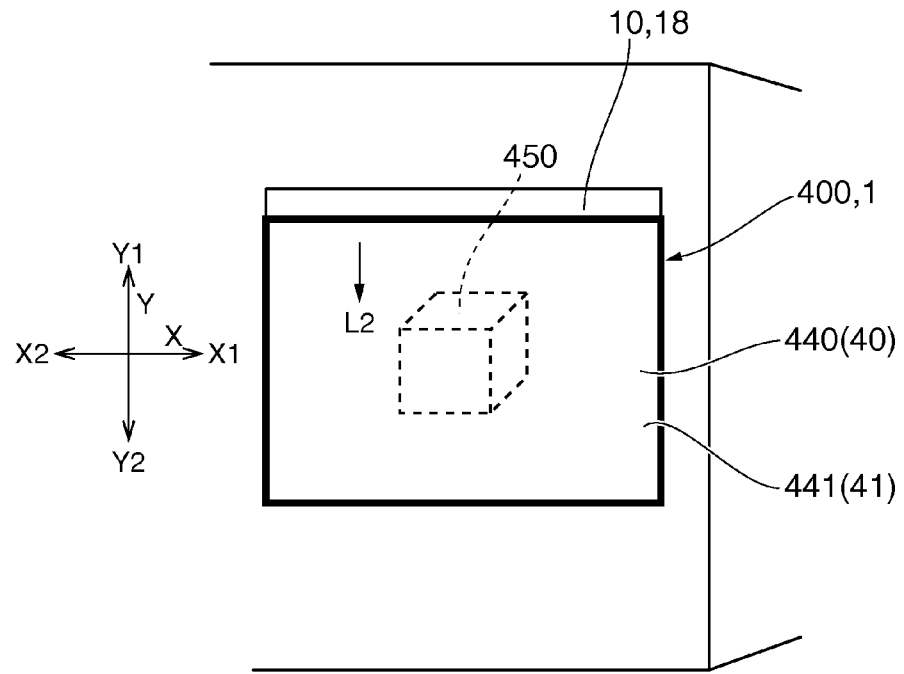
FIGS. 13A and 13B are explanatory diagrams of specific example 3 of the equipment with position detection function to which the embodiment of the invention is applied (a window with position detection function).
Figure 13B:
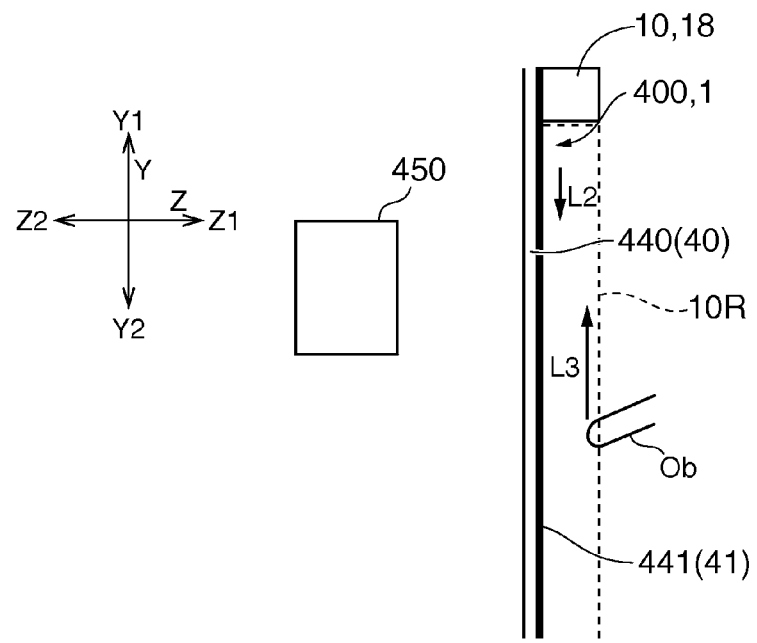

Referring to FIGS. 13A and 13B, an example of forming the equipment with position detection function 1 as a window with position detection function using a light-transmissive member that covers an exhibit as information as the visual surface component member 40 of the equipment with position detection function 1 will be explained. FIGS. 13A and 13B are explanatory diagrams of specific example 3 of the equipment with position detection function 1 to which the embodiment of the invention is applied (the window with position detection function), and FIGS. 13A and 13B are an explanatory diagram schematically showing the window with position detection function seen from outside (the visual surface side), and an explanatory diagram schematically showing the section thereof. Note that, in the equipment with position detection function (the window with position detection function) of the embodiment, the configuration of the optical position detection device 10 is the same as the configurations explained with reference to FIGS. 1A to 10, and the same signs are assigned to shown the common parts and their explanation will be omitted.

The window with position detection function 400 (the equipment with position detection function 1) shown in FIGS. 13A and 13B includes a light-transmissive member 440 (the visual surface component member 40) that covers an exhibit 450 as information, and the visual surface (the visual surface 41) of the exhibit 450 is formed by an outer surface 441 of the light-transmissive member 440. Further, in the window with position detection function 400, the exhibit 450 is held by an actuator (not shown) that allows the exhibit 450 to perform forward and rotating movement or the like.

The window with position detection function 400 includes the optical position detection device 10 explained with reference to FIGS. 1A to 10 at the side of the outer surface 441 of the light-transmissive member 440. The optical position detection device 10 outputs the detection light L2 along the outer surface 441 (the visual surface 41) of the light-transmissive member 440 and detects the light reflected by the target object Ob. Therefore, the detection space 10R of the optical position detection device 10 is set at the outer surface 441 side of the light-transmissive member 440. Thus, if the target object Ob such as a finger tip is allowed to enter the detection space 10R, the position of the target object Ob may be used as input information such as a command for switching the direction of the exhibit 450 or the like. For example, if the target object Ob such as a finger tip is shifted downward (toward the other side Y2 in the Y-axis direction), the exhibit 450 may be moved closer to the light-transmissive member 440, and, if the target object Ob such as a finger tip is shifted to the right (toward the one side X1 in the X-axis direction), the direction of the exhibit 450 may be changed such that the exhibit 450 is rotated clockwise.

Figure 14A:
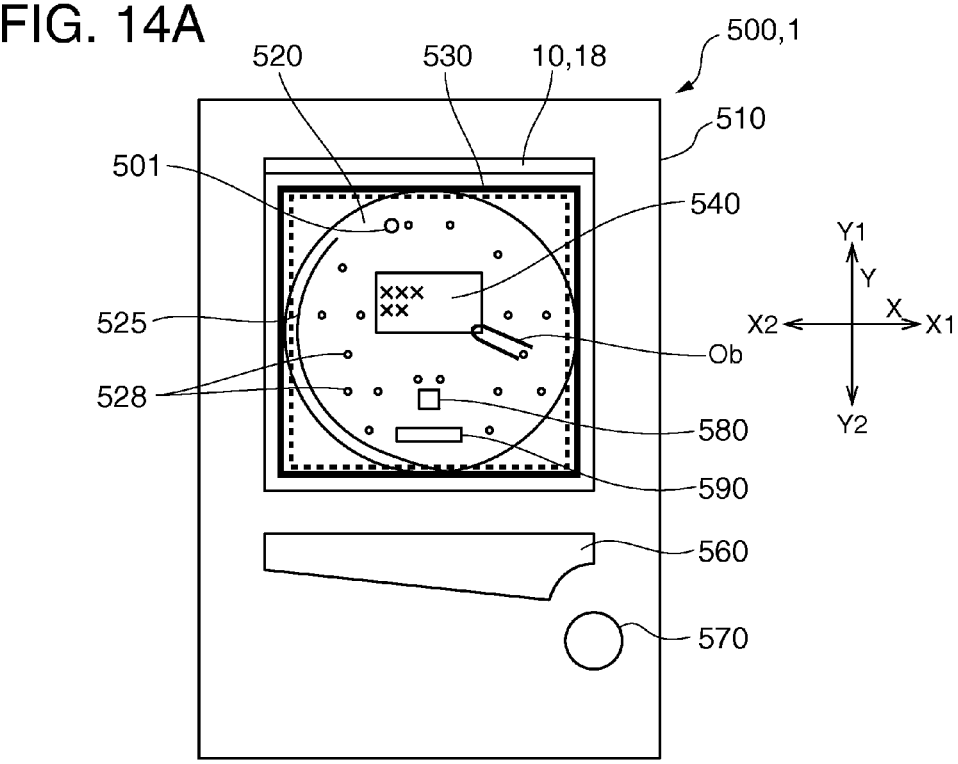
FIGS. 14A and 14B are explanatory diagrams of specific example 4 of the equipment with position detection function to which the embodiment of the invention is applied (an amusement machine with position detection function).
Figure 14B:
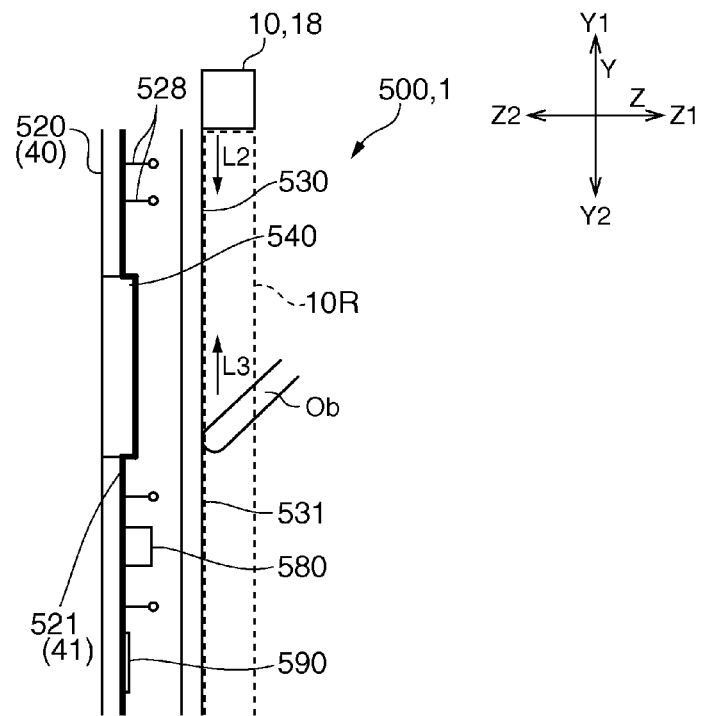

Specific Example 4 of Equipment with Position Detection Function 1 according to First Embodiment Referring to FIGS. 14A and 14B, an example of forming an amusement machine as an amusement machine with position detection function using a base that supports a gaming medium in an amusement machine such as a Japanese pinball machine as the visual surface component member 40 of the equipment with position detection function 1 will be explained. FIGS. 14A and 14B are explanatory diagrams of specific example 4 of the equipment with position detection function 1 to which the embodiment of the invention is applied (the amusement machine with position detection function), and FIGS. 14A and 14B are an explanatory diagram schematically showing the amusement machine with position detection function seen from the front side (the visual surface side), and an explanatory diagram schematically showing the section thereof. Note that, in the equipment with position detection function 1 (the amusement machine with position detection function) of the embodiment, the configuration of the optical position detection device 10 is the same as the configurations explained with reference to FIGS. 1A to 10, and the same signs are assigned to shown the common parts and their explanation will be omitted.

The amusement machine with position detection function 500 (the equipment with position detection function 1) shown in FIGS. 14A and 14B includes a plate-like base 520 (the visual surface component member 40) that supports a gaming medium 501 such as a ball of pinball, an outer frame 510 that holds the base 520, a handle 570 that sets the position in which the gaming medium 501 is released onto the base 520 or the like, a receiver 560 that receives the gaming medium 501, etc. A surface 521 (the visual surface 41) of the base 520 is covered by a glass plate 530, and, on the surface 521 of the base 520, inside the glass plate 530, guide rails 525 for the gaming medium 501, nails 528 that change the motion of the gaming medium 501, prize openings 580, 590, etc. are provided. Further, on the surface 521 of the base 520, inside the glass plate 530, a liquid crystal device 540 on which results of lots drawn at each time when the gaming medium 501 enters the prize opening 580 etc. are displayed is provided.

In the amusement machine with position detection function 500, at the upper end side of the outer surface 531 of the glass plate 530, the optical position detection device 10 explained with reference to FIGS. 1A to 10 is provided, and the optical position detection device 10 outputs the detection light L2 along the outer surface 531 of the glass plate 530 and the surface 521 (the visual surface 41) of the base 520 and detects the light reflected by the target object Ob. Therefore, the detection space 10R of the optical position detection device 10 is set at the outer surface 531 side of the glass plate 530. Thus, if a player moves the target object Ob such as a finger tip closer to the detection space 10R according to the contents displayed on the liquid crystal device 540 and the progress of the game, the position of the target object Ob may be used as input information such as a command for switching the contents displayed on the liquid crystal device 540 or the like.

What is claimed is:

1. An optical position detection device comprising:
    a detection light source section which includes a first detection light source unit which outputs a first detection light and a second detection light source unit which outputs a second detection light, a timing when the first detection light source unit is turned on being different from a timing when the second detection light source unit is turned on;
    a light detection unit which is arranged in a housing and detects the first detection light and the second detection light reflected by an object;
    a reference light source unit which is arranged in the housing and outputs a reference light entering the light detection unit not via an exterior part of the housing;
    a light source drive unit which drives the detection light source section and the reference light source unit; and
    a position detection unit which detects a position of the object on the basis of an intensity of the first detection light, an intensity of the second detection light and an intensity of the reference light.

2. The optical position detection device according to claim 1, wherein the position detection unit detects the position of the object on the basis of a result of a differential operation between the detection light source section and the reference light source unit.

3. The optical position detecting device according to claim 1, wherein the position detection unit detects the position of the object on the basis of the difference between the intensity of the first detection light and the intensity of the second detection light.

4. The optical position detection device according to claim 1,
    wherein the first detection light source unit and the second detection light source unit are arranged in the housing, and the light detection unit is arranged between the first detection light source unit and the second detection light source unit.

5. The optical position detection device according to claim 1, wherein the first detection light source unit and the second detection light source unit include a plurality of light emitting devices arranged on the same straight line in the housing.

6. The optical position detection device according to claim 5, wherein the light source drive unit executes a first mode in which some light emitting devices of the plurality of light emitting devices are turned on and a second mode in which the light emitting devices other than those of the first mode of the plurality of light emitting devices are turned on.

7. The optical position detection device according to claim 1, wherein the first detection light, the second detection light and the reference light are infrared light.

8. Equipment with a position detection function comprising:
    the optical position detection device according to claim 1; and
    a visual surface component member having a visual surface,
    wherein the first detection light and the second detection light are outputted to be overlapped with the visual surface.

* * * * *